US011792405B2

(12) United States Patent
Streater

(10) Patent No.: US 11,792,405 B2
(45) Date of Patent: Oct. 17, 2023

(54) CODEC

(71) Applicant: Blackbird plc, London (GB)

(72) Inventor: Stephen Streater, London (GB)

(73) Assignee: Blackbird plc

( * ) Notice: Subject to any disclaimer, the term of this patent is extended or adjusted under 35 U.S.C. 154(b) by 270 days.

(21) Appl. No.: 17/378,464

(22) Filed: Jul. 16, 2021

(65) Prior Publication Data
US 2021/0344928 A1    Nov. 4, 2021

Related U.S. Application Data

(63) Continuation of application No. 16/475,997, filed as application No. PCT/GB2018/050013 on Jan. 4, 2018, now Pat. No. 11,082,699.

(30) Foreign Application Priority Data

Jan. 4, 2017    (GB) ..................................... 1700086

(51) Int. Cl.
| | | |
|---|---|---|
| *H04N 19/137* | (2014.01) | |
| *H04N 19/119* | (2014.01) | |
| *H04N 19/159* | (2014.01) | |
| *H04N 19/172* | (2014.01) | |

(52) U.S. Cl.
CPC ......... *H04N 19/137* (2014.11); *H04N 19/119* (2014.11); *H04N 19/159* (2014.11); *H04N 19/172* (2014.11)

(58) Field of Classification Search
CPC .. H04N 19/137; H04N 19/119; H04N 19/159; H04N 19/172; H04N 19/513; H04N 19/86; H04N 19/521; H04N 19/53; H04N 19/56; H04N 19/433; H04N 19/55
See application file for complete search history.

(56) References Cited

U.S. PATENT DOCUMENTS

| | | | |
|---|---|---|---|
| 2017/0094311 A1* | 3/2017 | Chou | ..................... H04N 19/53 |
| 2018/0176596 A1* | 6/2018 | Jeong | ..................... H04N 19/82 |

* cited by examiner

*Primary Examiner* — Joseph W Becker
(74) *Attorney, Agent, or Firm* — Crawford Maunu PLLC

(57) ABSTRACT

As may be implemented with one or more embodiments, a video stream is divided into a key frame and subsequent chunks of frames including a key frame and Delta ($D^x$) frames constructed from adjacent frames by dividing the frame into Motion Regions representing groups of pixels, determining a pixel group in an Earlier and later frame that is a best match for a pixel group in a Motion Region of a Current frame, and determining motion vectors for best matches for the Motion Regions and/or by intra-frame compression. A bitstream may be built such that as x increases, motion vector and other data relating to a combination of $D^x$ frames is represented by data that is less than all the data in the combination of $D^x$ frames and increases at a lower rate than the quantity of frames in $D^x$ compared to the quantity of frames in $D^{x-1}$.

21 Claims, 21 Drawing Sheets

U = V = 0 (grey scale)    UV = near grey    UV = not near grey

Diagram indicating various regions of UV space where different calculations are used to provide UV values Transition tables user view Chunks Figure 3
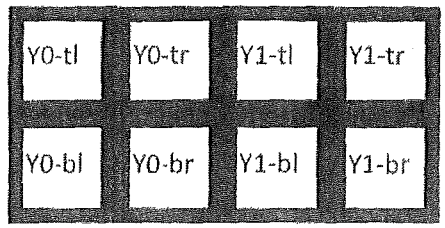 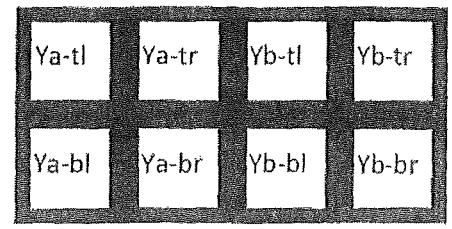
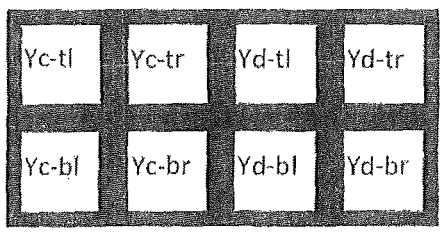 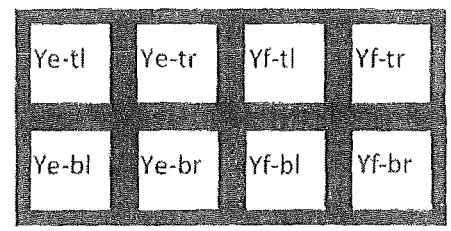
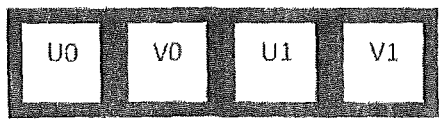 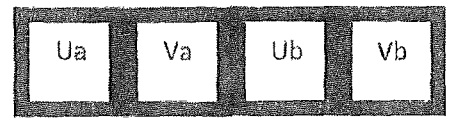
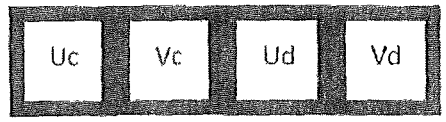 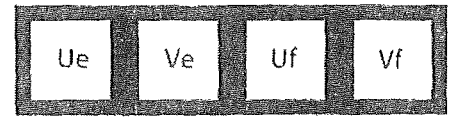
VIDEO FRAME FORMAT Various rectangular block sizes Motion Region Y and UV components from two frames Pixels guaranteed known when a pixel is decoded Corner values average of pixels they touch Y values for each square (every square is a pixel)

Top left of frame Y corner pixel values used for interpolation

Image of Y, U or V values

To compress br:

Data compressed is (br+tl-tr-bl) truncated to 8 bit signed integer
Context is (2tl-tr-bl) truncated to 8 bit signed integer

Diagram showing how a pixel value is compressed

First few levels of Key and Delta frames
In this example, Key frames are 8n frames apart Example file format and naming convention for stored compressed frames for case where Key frames are 64 frames apart. <chunk> is the Chunk number.

Example file format and naming convention for stored compressed frames for case where Key frames are 64 frames apart, and the different Key and Delta frame levels are combined into groups of 20 chunks to reduce number of disk accesses when shuttling and playing back at a multiple of normal speed. <chunk> is the Chunk number.

Figure 12

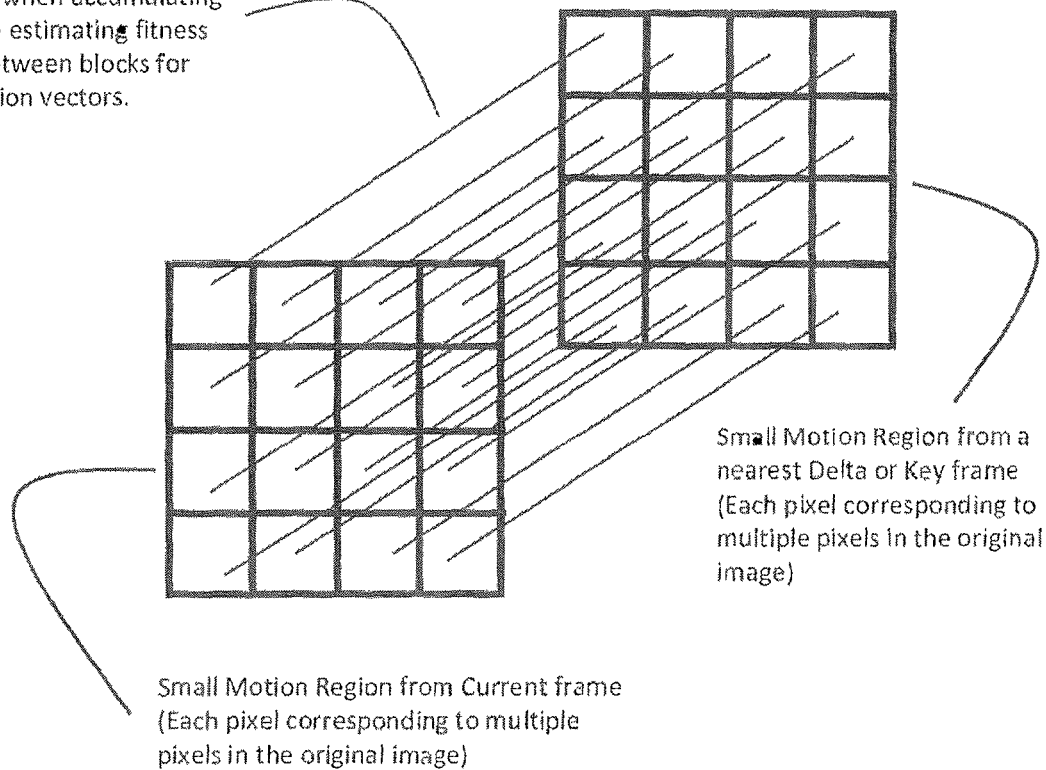

Lines showing which pixels correspond when accumulating errors while estimating fitness of match between blocks for chosen motion vectors.

Small Motion Region from a nearest Delta or Key frame (Each pixel corresponding to multiple pixels in the original image)

Small Motion Region from Current frame (Each pixel corresponding to multiple pixels in the original image)

Diagram showing how pixels in blocks correspond in a motion search

Figure 13
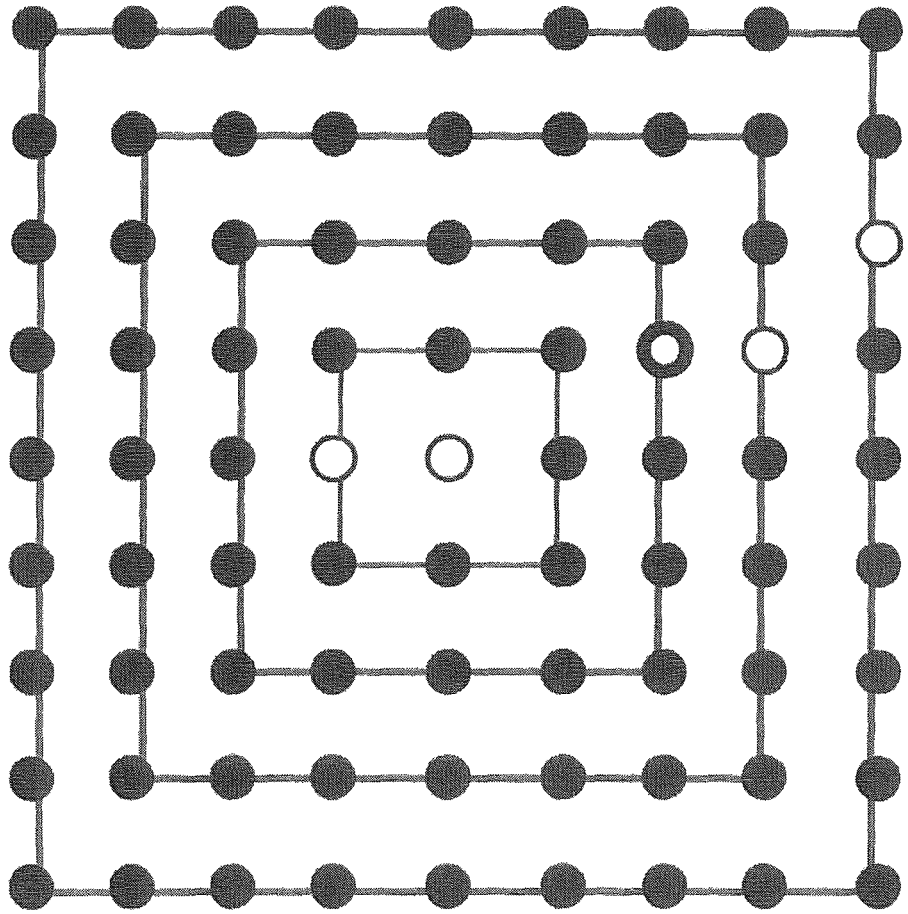
 Minimum error for each of Rings 0,1,3,4
 Minimum error for all Rings 0,1,2,3,4
Search starts from the central motion vector and works outwards a Ring at a time (starting from the central Ring, Ring 0, and working outwards to Ring 1, Ring 2, Ring 3, ...
In this case, the search stops after Ring 4, with the "best" motion vector on Ring 2.
Ring Search with square "Rings"

Frame L

Frame C

Frame E

Figure 15:
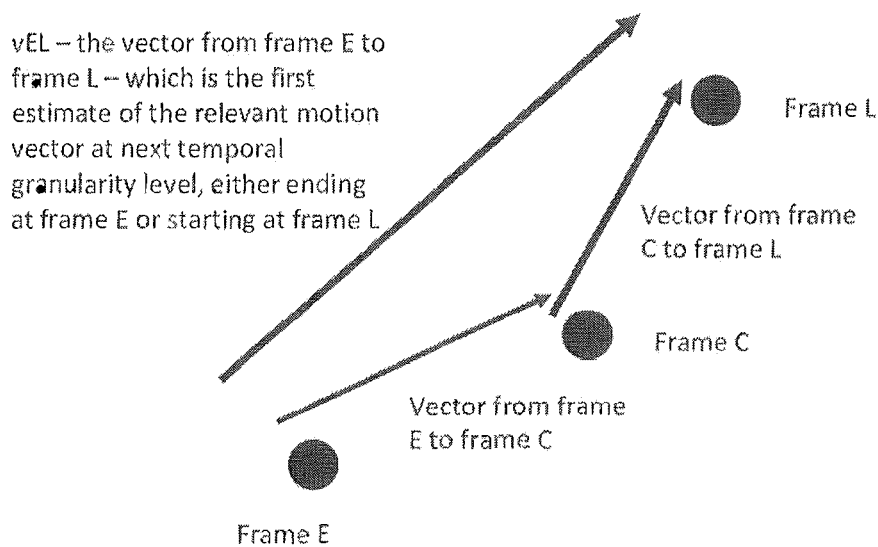

Constant motion automatic anti-aliasing case works best when motion is uniform between Frame E and Frame L Diagram showing that motion vectors previously calculated in a finer temporal granularity level are added together to give a first estimate of the motion vector vEL at a coarser temporal granularity Diagram showing initial motion vector vEL for search not at finest temporal granularity level, (and other motion vectors for search) combined from previously calculated motion vectors as calculated in Figure 15

Diagram showing absence of matching blocks between frames containing different slope of uniform gradients Diagram showing absence of matching blocks between frames containing different direction of uniform gradients

Figure 19

Diagram showing 'sign' of pixel errors in top left section of
a motion region before and after processing to remove
edges of clumps with different error 'signs'

Deciding which of E and L frame Motion Regions to use in estimating a C frame Motion Region Figure 21
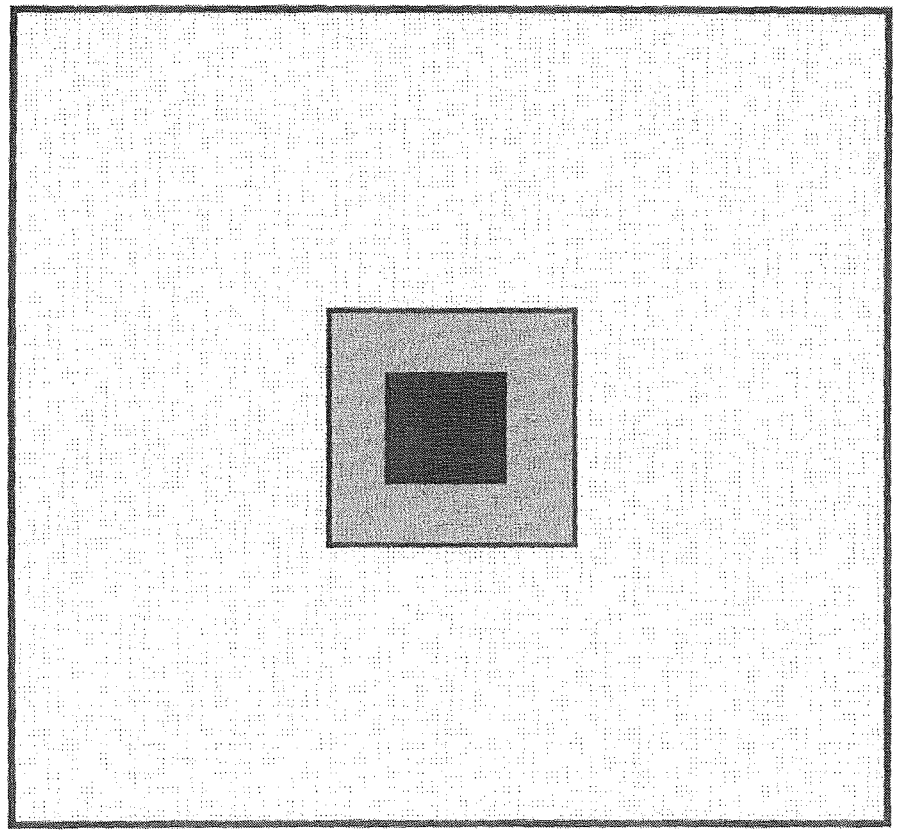
U = V = 0 (grey scale)  UV = near grey  UV = not near grey
 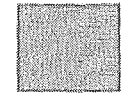 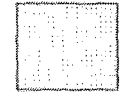
Diagram indicating various regions of UV space where
different calculations are used to provide UV values

CODEC

INTRODUCTION

With the transition to digital, video compression has become central to worldwide video use. Almost all video compression is suitable for video streaming, but there has been little thought in comparison given to the needs of video editing software—and in particular cloud video editing software able to support multiple live source streams on multiple devices or standard mass-produced devices without dedicated video hardware.

The following documents are related to the subject matter of the present application: Patent application PCT/GB2016/052223, "Compressor"; GB0116482, "Compressed Video"; EP01945541.9 "Method for reducing code artefacts in block coded video signals"; EP 04798481 "Improvements to representations of compressed video"; EP1738365 "A method for enabling efficient navigation of video"; and GB2448279 "A method for compressing video data and a media player for implementing the method".

The present invention (referred to as "blackbird 9") is directed to this area.

The present invention is directed, in accordance with a first aspect, to a method for encoding and decoding a video stream comprising dividing the video stream into a first Key frame, and subsequent chunks each comprising $2^n$ frames. Each chunk includes a Key frame and $2^n-1$ Delta ($D^x$) frames, where x is a positive integer and denotes the level of the Delta frame, and where $2^{x-1}$ denotes the number of Delta frames at that level in the chunk. The method includes the step of constructing $D^x$ level frames from adjacent Earlier and Later $D^y$ frames, (where y<x and where for y=0, $D^y$ is a Key frame), for all frames in a chunk where x>0, wherein the constructing step includes dividing the frame into Motion Regions representing groups of pixels; determining a pixel group in an Earlier (E: $D^y$) and later (L: $D^y$) frame that is a best match for a pixel group in a Motion Region of a Current (C: $D^x$) frame; determining motion vectors for the best matches for Motion Regions, or by intra-frame compression of frame C. The method is characterized by eliminating unnecessary information when building a bitstream such that as x increases, motion vector and other data relating to a combination of $D^x$ frames (more numerous than the $D^{x-1}$ frames) is represented by a quantity of data in the bitstream that, for a typical video, increases at a much lower rate than the quantity of frames in $D^x$ compared to the quantity of frames in $D^{x-1}$.

Preferably the combination of $D^x$ frames includes all the $D^x$ frames.

Preferably the lower rate is between 25% and 75%, or between 40% and 60%, or between 45% and 55% of the rate, so the total of all $D^x$ frame data is the same as for all $D^{x-1}$ frame data, for x>1.

Preferably during encoding, Key frame compression comprises intra-frame compression, whereas as x increases information on $D^x$ frames also includes inter-frame compression from respective $D^y$ frames.

Preferably determining the best match includes, for each frame, determining Small Frames derived from averaging pixels in respective frames, comparing groups of pixels in the Small Frames of said E and/or L ($D^y$) to establish candidate motion vectors to map onto Small Motion Regions of the Small C ($D^x$) Frame, and wherein said comparing step includes for each motion vector tested, comparing pixels, with the motion vector applied, in the Small Frames of E and/or L, with the Small Motion Region in the Small C Frame, iteratively, until a 'best match' can be identified, and iteratively for each Small Motion Region in C.

Preferably candidate motion vectors are established by searching in concentric squares, or in a diamond pattern, until no better match is found for two or more consecutive searches.

Preferably the best match is determined by applying candidate motion vectors to pixels in candidate groups of pixels of said Small Frame version of E (the E Small Frame) or Small Frame version of L (the Small L Frame) to predict pixel values in a Small Motion Region of said C Small Frame; comparing said predicted values with actual pixel values in said Small Motion Region of said C Small Frame; determining differences between said predicted and actual pixel values to establish an Error value; determining a Significance of each Error value, wherein the Significance is a function of the Error value and summing said Significances, wherein the respective best matches for the pixel groups in the E Small Frame and the pixel groups in the L Small Frame are the motion vectors which give the smallest sum of Significances.

Preferably the motion vectors are further refined by analyzing versions of the E, C and L frames at increasing resolution until they are pixel accurate.

Preferably the best match is determined by applying candidate motion vectors between groups of pixels in E and corresponding groups of pixels in L, to predict pixel values in a Motion Region of said C frame, thereby avoiding sending motion vectors for said C frame in the bitstream.

Preferably the candidate motion vectors for groups of pixels in E to the Motion Region in C are equal to the candidate motion vectors from the Motion Region in C to the group of pixels in L.

Preferably the further comprises correcting inaccuracies by determining, for each neighborhood comprising a predetermined number of pixels, the difference in grey scale value of adjacent pixels in each direction, such that if the difference is no greater than 1, or no greater than 2, or no greater than 3 grey scale values: in three or four directions, no difference is permitted between predicted and actual pixel values, and any difference is corrected; in 2 directions, a maximum value of difference is permitted between predicted and actual pixel values before a correction is applied, wherein said maximum can vary between 1 and 16 greyscales; in one or zero directions, a larger difference than in two directions is permitted before a correction is applied.

Preferably the predetermined number of pixels is 2, 3, 4 or 5 pixels.

Preferably the Significance is an increasing function of the absolute value of the error, with a gradient that increases as the error approaches a predetermined maximum allowed error per pixel, and falls where the error exceeds a maximum allowed error per pixel.

Preferably, if the estimate for the Motion Region based on the E or L frames has an error greater than a predetermined value, the respective predictor is not used, wherein as x increases within a chunk, the allowable error between predicted and actual Motion Region values is an increasing function of x.

Preferably the method further comprises assigning differences between estimated and actual pixel values as 0, −1 or +1, where:

0 corresponds to a difference of approximately 0,

−1 corresponds to a significant negative difference, and

+1 corresponds to a significant positive difference, wherein significant corresponds to a desired picture quality, where high values provide lower picture quality; further comprising re-assigning to zero each pixel whose sign is different to any adjacent pixel, deriving a value from the number of remaining positive or negative values at or near a Motion Region edge; and rejecting the motion vector and corresponding predictive group of pixels from E or L frames for this Motion Region as a poor match if this value exceeds a threshold.

Preferably $D^x$ (Delta) frames are encoded and decoded by referencing Transition Tables and Context; each Context code word giving a Transition Table with its own distribution.

Preferably if one of the relevant groups of pixels from an E or L frame touches the edge of its frame, and the other of the E or L predictors suggests that the said predictor group of pixels on the edge should be off its screen and thus is Suspicious, then the E or L frame group of pixels with the Suspicious component is excluded from the prediction of the Motion Region in C.

Preferably for neighboring blocks with differing motion vectors, the maximum allowable error values for pixels on sides of Motion Regions that touch, is reduced for the half each Motion Region at the touching edges.

Preferably respective Key and Delta frames from respective chunks are stored together such that Key frames are stored in a Key frame file, $D^1$ frames are stored in a Delta 1 frame file, and so on until $D^x$ frames, for the greatest value of x in the chunk, are stored in a $D^x$ frame file.

The invention discloses, in accordance with a second aspect, a method of encoding a video in accordance with the features set out above.

The invention discloses, in accordance with a third aspect, a method of decoding a video encoded in accordance with the features set out above.

The invention discloses, in accordance with a third aspect, a codec utilizing the method as set out above.

The invention discloses, in accordance with a fourth aspect, a device including the codec in accordance with the above.

The invention discloses, in accordance with a fifth aspect, a device adapted to capture a video stream and encode same according to the above.

The invention discloses, in accordance with a sixth aspect, a device adapted to receive a bitstream encoded by the method set out above.

The invention discloses, in accordance with a seventh aspect, a device as disclosed above, adapted to decode the bitstream in accordance with the method above.

Figure 1:
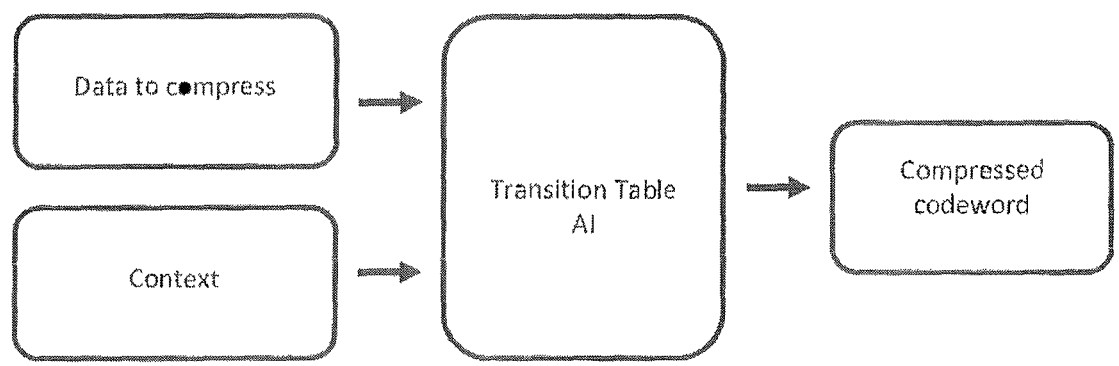
Figure 2:
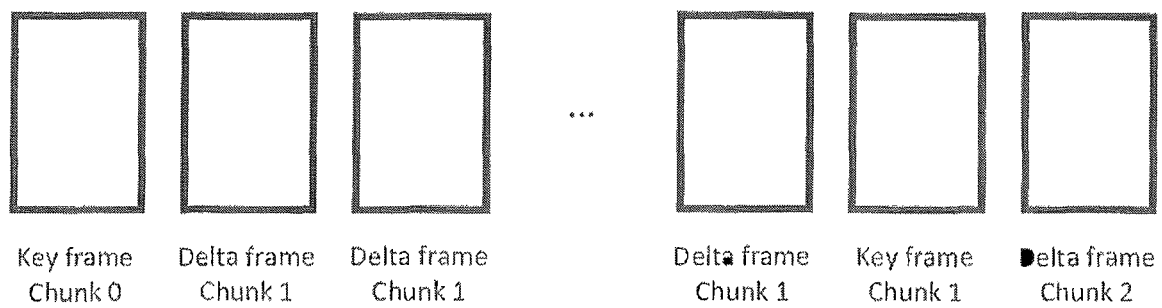
Figure 4:
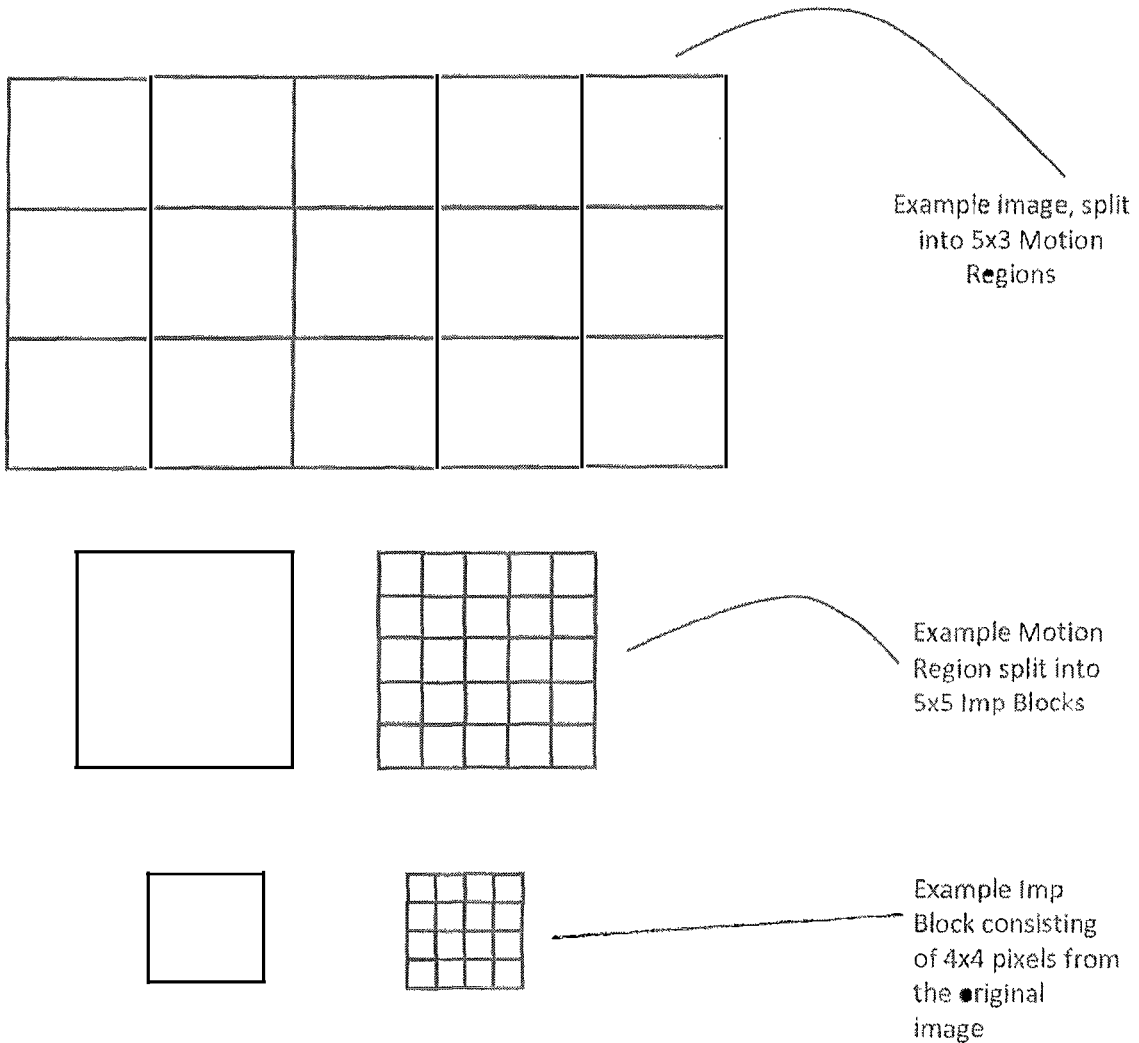
Figure 5:
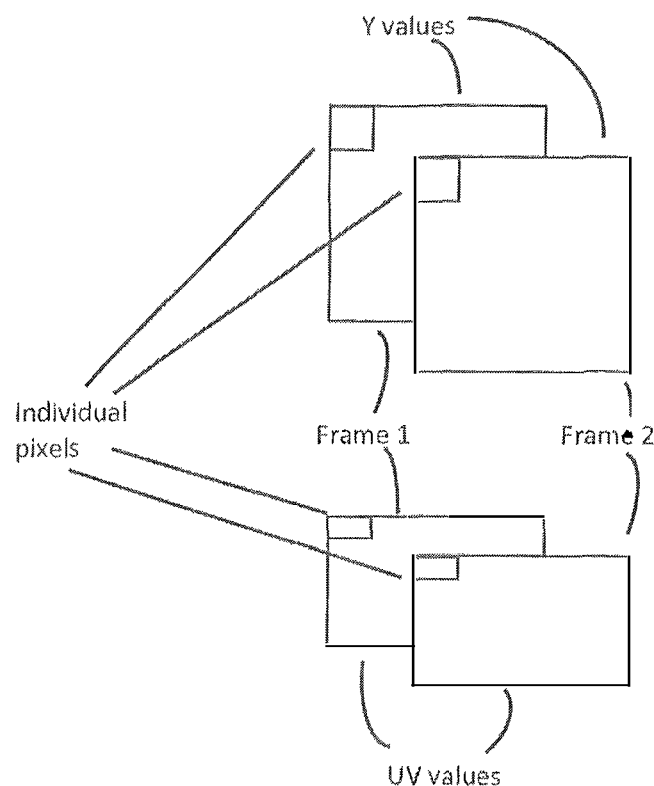
Figure 6:
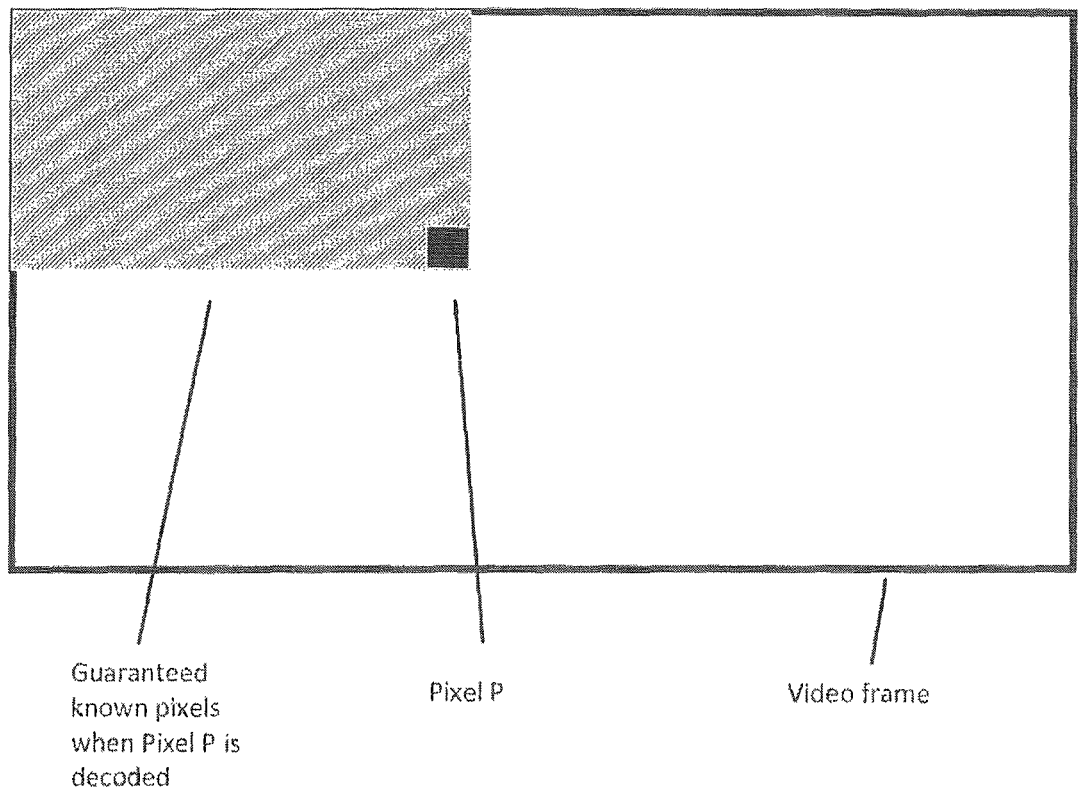
Figure 7:
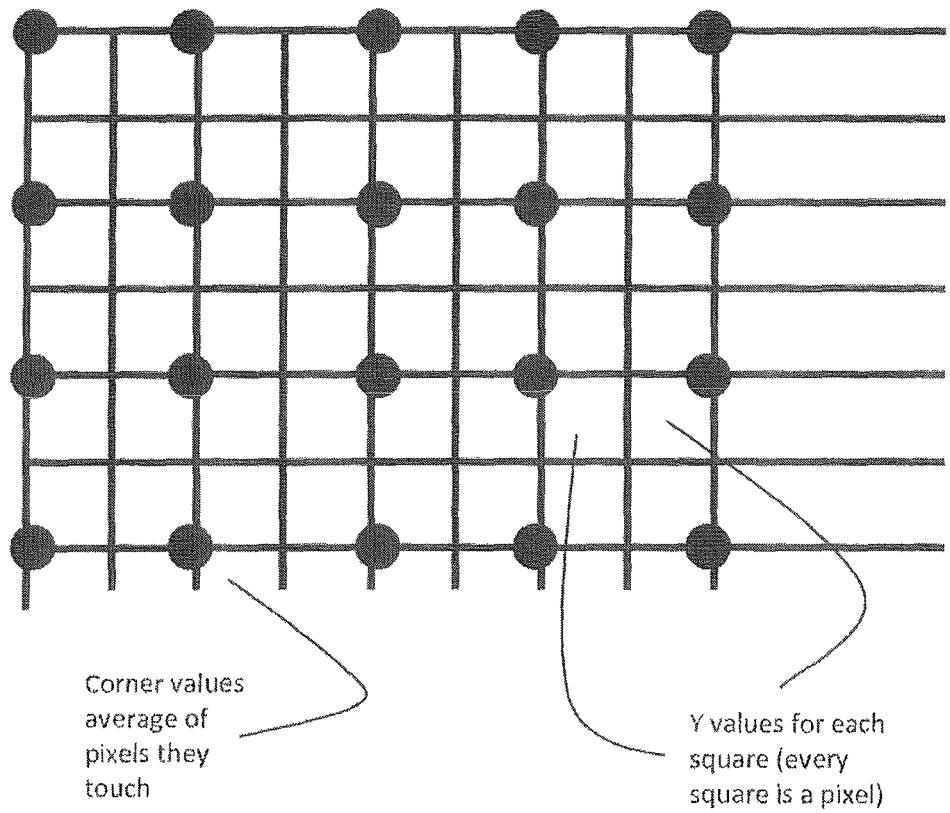
Figure 8:
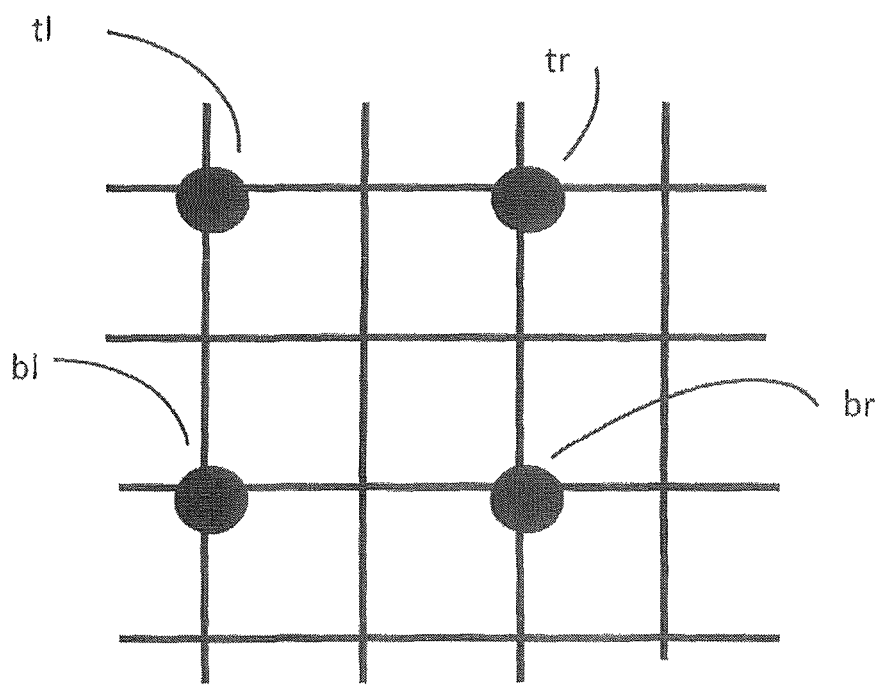
Figure 9:
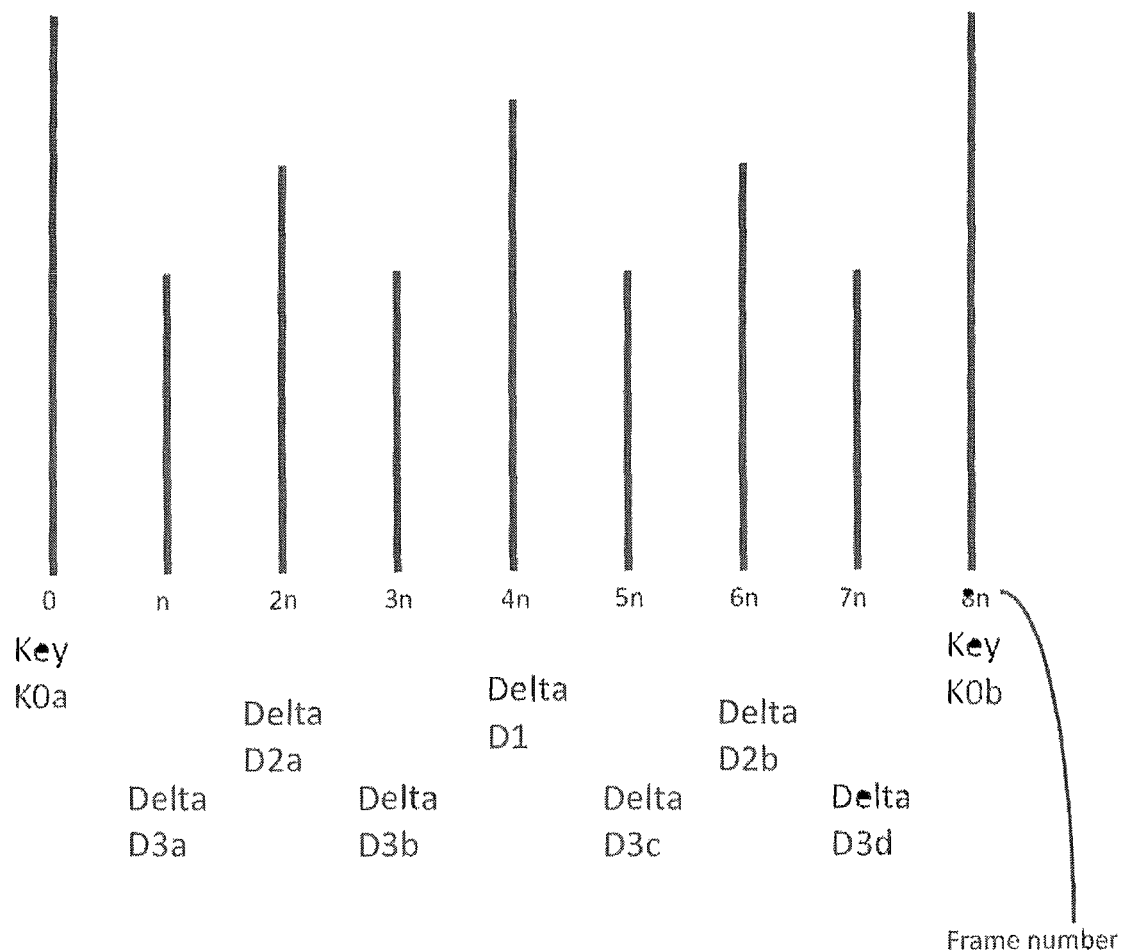
Figure 10:
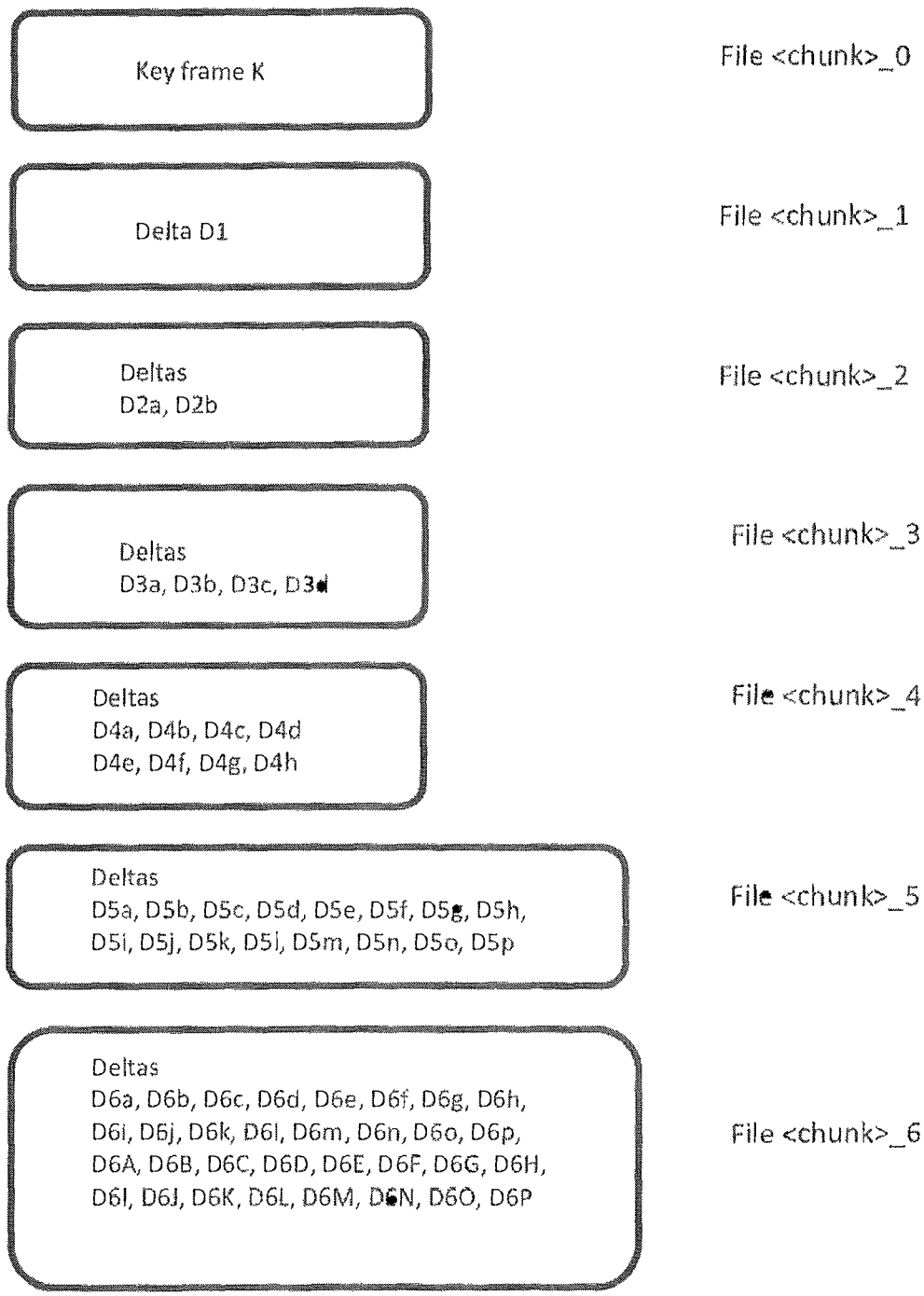
Figure 11:
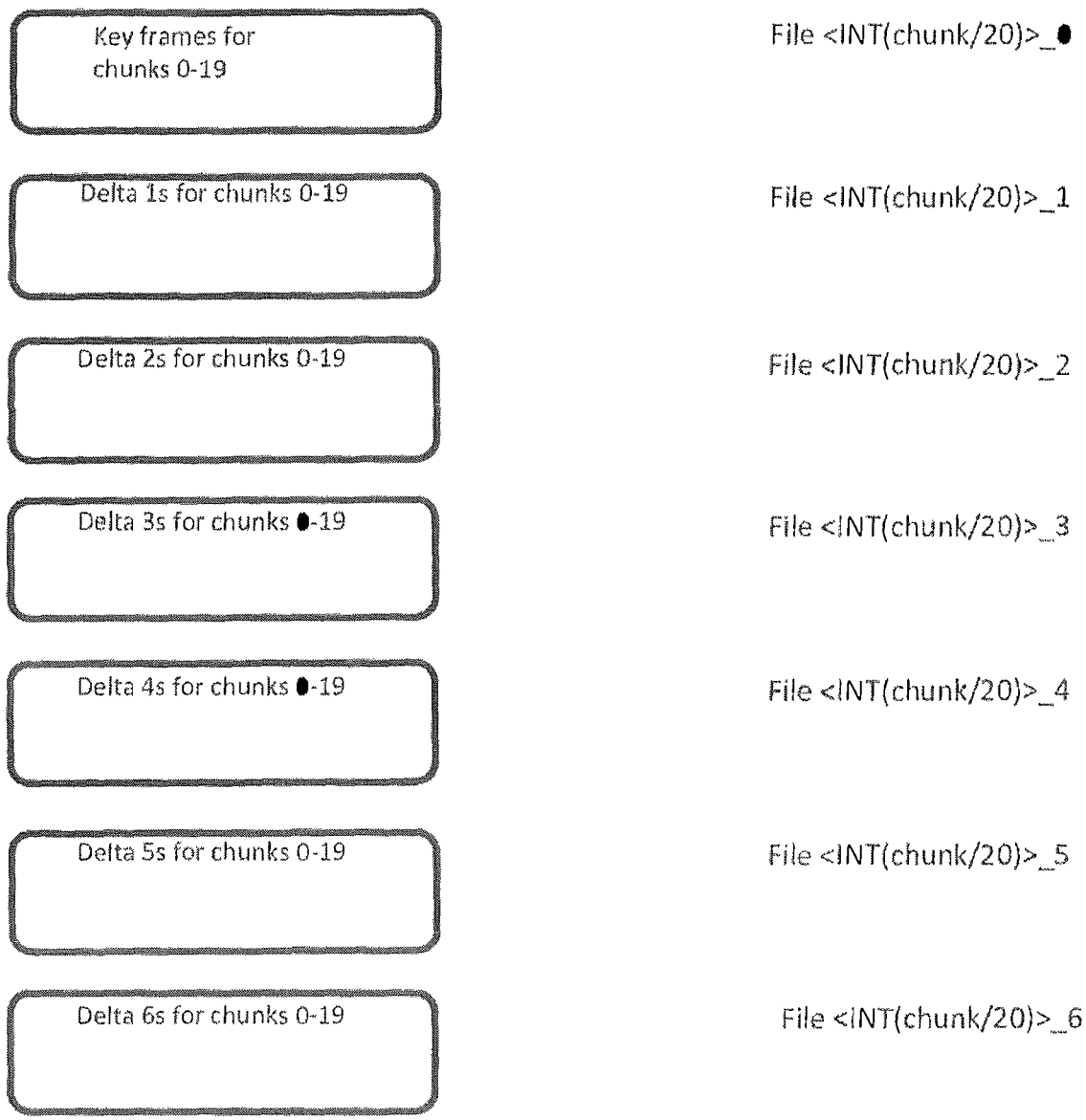
Figure 14:
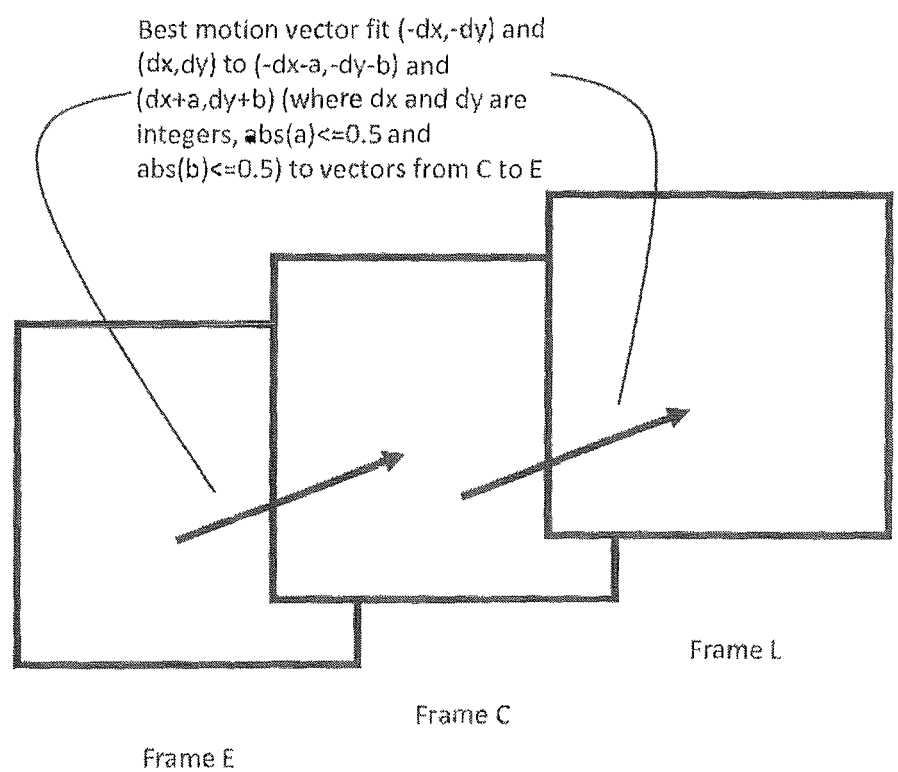
Figure 16:
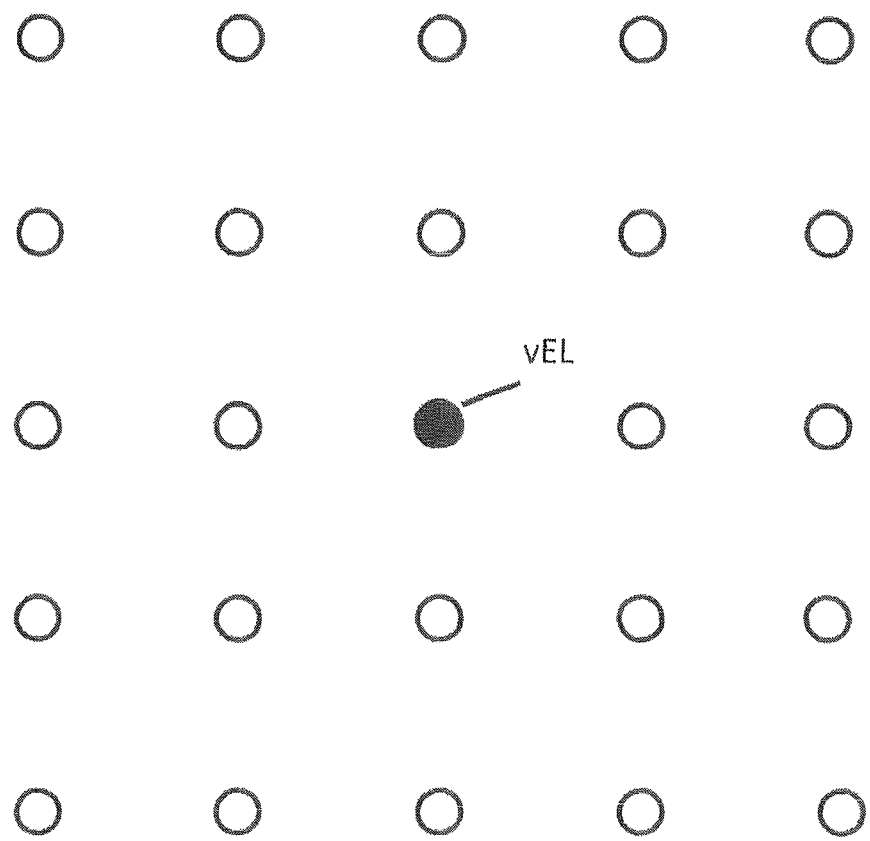
Figure 17:
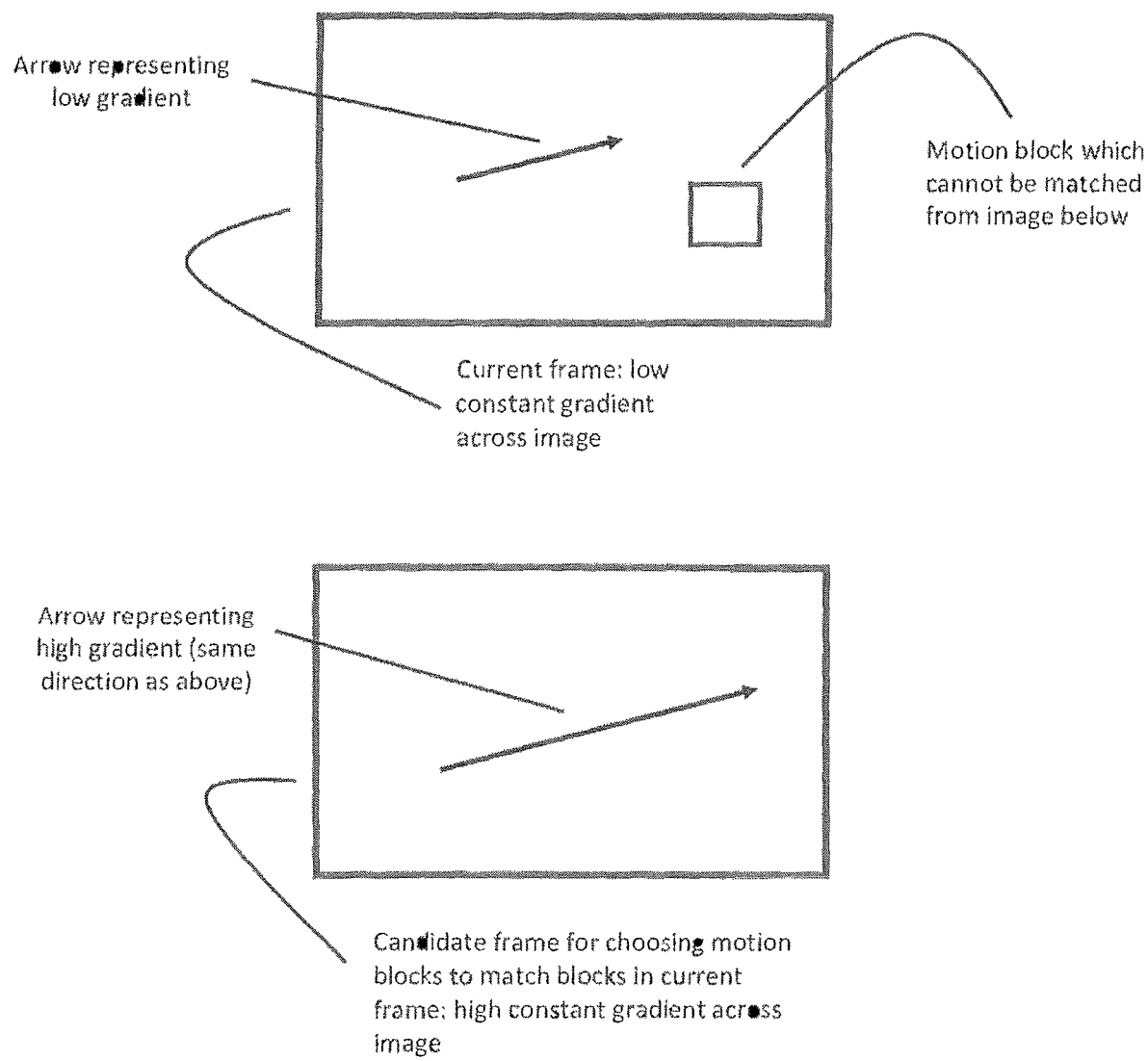
Figure 18:
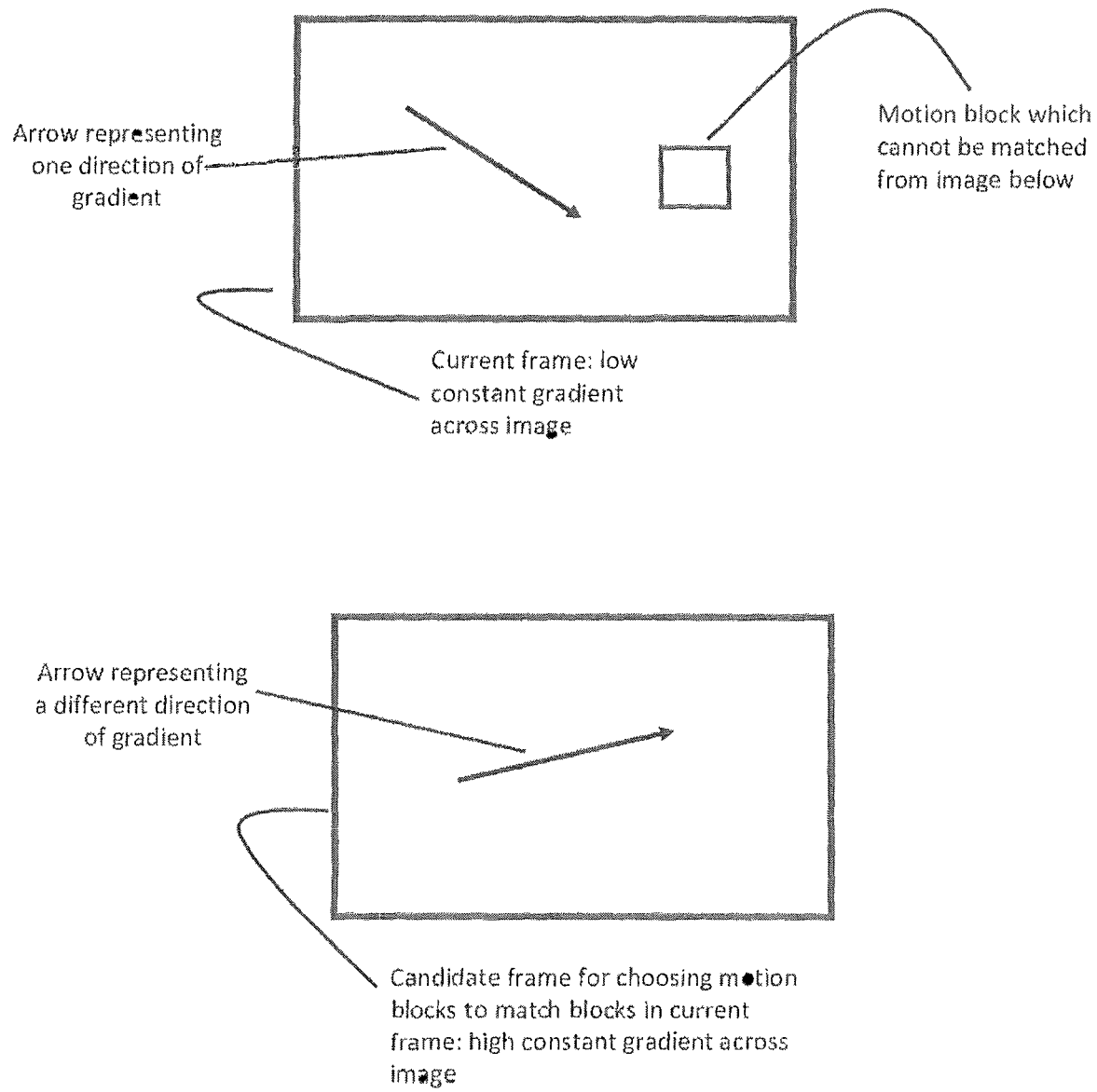
Figure 20:
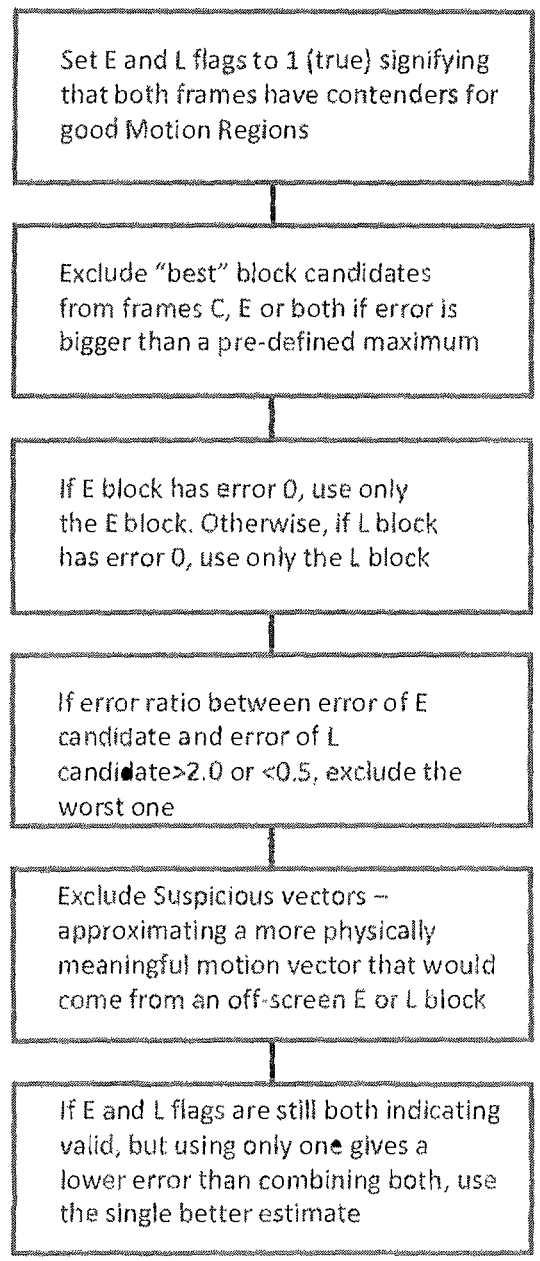

The present invention will now be described, with reference to the accompanying drawings in which FIG. 1 provides a Transition Tables user view, FIG. 2 shows consecutive chunks in a compressed video, FIG. 3 shows video formats, FIG. 4 shows various block sizes, FIG. 5 shows Motion Regions, FIG. 6 shows pixels guaranteed known when a pixel is decoded, FIG. 7 shows the top left of frame Y corner pixel values used for interpolation, FIG. 8 shows how a pixel value is compressed, FIG. 9 shows the first few levels of exemplary key and delta frames, FIG. 10 illustrates exemplary recommended file formats, FIG. 11 provides a further exemplary file format and naming convention, FIG. 12 shows how pixels in blocks may correspond in a motion search, FIG. 13 shows an exemplary ring search, FIG. 14 shows a further exemplary search, FIG. 15 shows exemplary estimation approaches, FIG. 16 shows further exemplary estimation approaches, FIG. 17 shows an exemplary absence of matching blocks, FIG. 18 shows a further exemplary absence of matching blocks, FIG. 19 shows exemplary pixel error signs, FIG. 20 shows an exemplary flow diagram for deciding on motion regions, and FIG. 21 shows a diagram indicating various regions for different calculations.

Blackbird 9 is one of a sequence of video codecs, earlier members of which are, in general, discussed in the prior art documents referred to above. Blackbird 9 consists of a compressor for creating a compressed bitstream, and a decompressor for turning the compressed bitstream back into video. Different implementations also have various players, and these, like the decompressor itself, are implemented in a variety of languages including Java, C++ and JavaScript.

Blackbird 9 is designed to address the needs of the video editing market, which includes a need:
 for transmitting data at a low data rate;
 for random access to areas of the video;
 for efficient shuttle and jog at all temporal scales;
 to be amenable to software implementation;
 to provide support for multiple concurrent playback streams combined in real time;
 to provide high and consistent quality video frames;
 to provide a full frame rate;
 to provide full desktop, laptop and mobile support;
 to provide for real time compression; and
 to include low latency.

Transition Tables

Most of the codewords used are compressed using Forbidden's patented loss free compression methods "Transition Tables" (see FIG. 1), covered in detail elsewhere, for example in the documents referenced above. Transition Tables automatically make use of context information (Context) known to the compressor and decompressor at the time the pixel is to be compressed and decompressed to create codewords to encode/decode each value, the codewords being (on average) significantly shorter than those obtained using simple implementations of compression techniques such as Huffman encoding and arithmetic coding, resulting in significant improvements in compression rates for storage and/or transmission.

In Blackbird 9, Transition Tables are applied to the video compression. The compressor and decompressor each have an internal model of the decompressed video. One consequence of using Transition Tables Context to compress the video data is that the Context on the compressor and the Context on the decompressor must match exactly—without this decoding is not practical. Matching the Contexts is achieved in a simple way in a favored implementation by making sure the compressor and decompressor internal models match exactly that is the final adjusted pixels used by the compressor and represented by the bitstream output by the compressor exactly match the pixel values produced by the decompressor when it has decompressed the bitstream). This contrasts with MPEG decoders which are, in general, only "visually equivalent" to the compressor model.

Thus, the impact of any lossy compression of the video stream by the compressor is replicated exactly in the decompressor. This exact replication, which allows a wide range of Context to be used, gives a much lower data rate than would be possible without making use of the Context to inform the codec about which Blackbird 9 data distribution to use in each case.

In the preferred implementation, the Transition Tables method updates its compressed codewords automatically thousands of times every second, to ensure the compressed codewords remain optimal or near optimal. As stated, the compressor and decompressor both use the same Transition Tables, both have an identical internal model of the video, and both use the same bitstream, so that their Transition Tables updates will match exactly.

Approaches to Video Editing

The Blackbird 9 codec is suitable for video editing applications, where only part of each source video may be used in each edited clip. To allow video playback without having to handle the entire source video content, the compressed video comprises a series of consecutive Chunks, as described in UK Patent Application No. 1513610.4.

It is contemplated that, the chunks comprise a first chunk which is a single Key frame, and subsequent chunks each of which comprise a series of frames, the last one of which is a Key frame: the decompressor requires an earliest frame and a latest frame, both of which are Key frames, to decode the Chunk (see FIG. 2). In the preferred implementation, the later Key frame is considered part of the Chunk, but the earlier Key frame is not.

Key frames are compressed entirely using intra-frame compression techniques, i.e. they can be compressed independently of any other frames, The Transition Tables are reset on every Key frame so that they don't rely on any statistics gathered from elsewhere—in particular from other frames whereas Delta frames are compressed using inter-frame compression techniques, i.e. the Delta frame compression relies on other frames within the chunk only.

As the Transition Tables are reset on every Key frame, they don't rely on any statistics gathered from elsewhere—in particular from other frames outside the chunk: however, the constraint that the Transition Tables must be reset on Key frames does not apply to delta frames. The Transition Tables AI continues to learn from experience during encoding and decoding of the delta frames within the chunk, improving the codeword lengths, and a consequence of this is that the Delta frames must be decoded in the same order as they were encoded. The decompressor requires a nearest earlier, and a nearest later, Key frame to decode the Chunk (see FIG. 2).

Input Format

Blackbird 9 can be used with any source video format, but the preferred format, which is used internally by Blackbird 9, consists of 2×2 pixel blocks, each containing 4 Y (luminance) values, 1 U value and 1 V value (the UV values together describe the chrominance).

In a preferred implementation, each of the Y, U and V values are 8 bit values, with Y unsigned and U and V signed.

The format is summarized in FIG. 3 which shows (with YHij representing a respective luminance (Y) component of a 2×2 pixel block, where H is the number of the block, i indicates the t (top) or b (bottom) member of the block and j indicates the l (left) or r (right) member of the block) luminance Y values stored in memory first, followed by chrominance (UV) values. FIG. 3 shows that the top row includes values for Y0-tl, Y0-tr, Y1-tl, Y1-tr, . . . , Ya-tl, Ya-tr, Yb-tl, Yb-tr stored first: as indicated above, Y0-tl is 'top left of the first ($0^{th}$) 2×2 pixel block of the frame in the video chunk. This is immediately followed by the next row Y0-bl, Y0-br, Y1-bl, Y1-br, . . . , Ya-bl, Ya-br, Yb-bl, Yb-br, and so on until the last row (where the use of 'c' does not imply it follows directly from b) Yc-bl, Yc-br, Yd-tl, Yd-br, . . . , Ye-bl, Ye-br, Yf-bl, Yf-br (where Yf is the last ($f^{th}$) 2×2 pixel block of the frame in the video chunk.

FIG. 3 then shows that chrominance values follow immediately after luminance values in memory, with U0 followed by V0 being the color for the four Y0 luminance pixels, followed by U1 and V1 for the four Y1 pixels, and so on until the end of the color image Uf and Vf the color for the corresponding four Yf luminance pixels.

The Y values can go through a Y □ Y mapping function prior to compression, to change the appearance of the luminance; the U and V values can also be put through their own mapping functions. This would be required if the inputs were ten bits per component and an 8 bit per component Blackbird 9 version was being used.

Motion Search

As an overview, as part of the encoding process for Delta frames, a motion search is carried out comparing groups of pixels (for example from Motion Regions) from the current (C) frame with groups of pixels from earlier (E) or later (L) frames, seeking a best match, as set out in WO2017021688, so that motion vectors, based on the E and/or L frames, can potentially be derived, although other means are contemplated.

Block Sizes

Blackbird 9 can use one of a multiplicity of block sizes (see FIG. 4), constrained by the frame size of the source video. For simplicity, the source video frame size dimensions are referred to below as Frame_x by Frame_y pixels.

In a typical implementation, the source video frame size is the same as the decompressed video frame size, i.e. the decompressed video frame has the same number of pixels as the source video frame and has the same aspect ratio.

In a preferred embodiment, as discussed above, Blackbird 9 divides each frame into rectangular blocks (Motion Regions), typically squares of side Motion_Region_Size pixels. This is shown at the top of FIG. 4, with a frame divided into (in this example) 5×3 blocks. Any rectangular size is possible, but the codec works best when each Motion Region contains both vertical and horizontal features, and in general square Motion Regions work better than more stretched rectangles for this.

In a preferred implementation, Motion Region blocks are subdivided into smaller square blocks (Imp Blocks) of side Imp_Size pixels. An exemplary Motion Region is shown in the middle row of FIG. 4, in which the LH block is a Motion Region, and the RH block has been sub-divided into 25 Imp Blocks. An exemplary Imp Block is shown in the bottom row of FIG. 4, shown to represent 4×4 pixels from the original image.

Other pixel groups are contemplated to be present, for example 2×2 pixels, or other arrangements. As above, other rectangles are possible, though squares work well. Suggested alternatives include horizontal sizes which are multiple of the CPU word size to speed up memory accesses.

As stated, an Imp Block represents 4×4 pixels from the original image. Pixels in each Imp Block are averaged to generate an 'averaged pixel value'. The square block in the bottom row of FIG. 4 can also represent such an averaged pixel value, with the 4×4 block shown on the right of the bottom row providing an indication of the pixels from which the averaged value is calculated. A smaller version of the original frame, henceforth referred to as a Small Frame, is formed from such averaged pixel values, the Small Frame being a factor of Imp_Size smaller than the corresponding source video Frame in both horizontal and vertical dimensions.

In parallel with the original frame, the Small Frame is divided into Small Motion Regions, which are blocks of size Motion_Region_Size/Imp_Size. This division for a single Motion Region is shown in the center of FIG. 4. In the preferred implementation, these Small Motion Regions turn out to be square.

In particular, each Imp Block becomes a single averaged pixel in the Small Frame: once it is created, by averaging pixels, it can then be treated as just a pixel.

The source frame is tiled by Motion Regions, the Motion Regions are tiled by Imp Blocks, and the Small Frame is tiled by Small Motion Regions.

In a preferred embodiment, Motion_Region_Size is a divisor of Frame_x and Frame_y, and Imp_Size is a divisor of Motion_Region_Size. If Motion_Region_Size does not divide into Frame_x or Frame_y exactly (that is, without giving an integer result with no remainder), the frame can be padded with extra pixels to allow the division, but this adversely affects the data rate and the video quality along padded edges.

An example block size, given for illustration purposes only, is given below:
Source video frames: 640×360 pixels
Motion Regions: 20×20 pixels
Resulting, in this case, in 576 motion regions per frame.
Each Imp Block is a 4×4 pixel block, including 16 pixels, so that each motion region includes 25 Imp Blocks
Imp_Size: initially 4, reduced to 2 during the motion search: this will be discussed later.
Imp Blocks: Initially 4×4 pixels of the Source video frames, reduced to 2×2 pixels during the motion search: this will be discussed later.
Small Frame: 160×90 pixels.

As the averaged pixels comprising each Small Frame Imp Block are created by averaging out pixels from the original frame, the Motion Region contributing to the Small Frame (Small Motion Regions) includes 25 averaged pixel values (i.e. comprises a 5×5 'averaged pixel value' block, rather than a 20×20 original pixel block), meaning that a Small Motion Region, comprising these averaged pixel values, will include 14400 of these 'averaged pixel values' (i.e. the original 230400 (640×360) pixels have been reduced to 14400 (230400 divided by 16) 'averaged pixel values'). Compared to the original frame with 640×360 pixels, the Small Frame includes 160×90 'averaged pixel values'.

Small Motion Regions: Initially 5×5 pixels ('averaged pixel values'), increased to 10×10 pixels during the motion search: this will be clarified when setting out the Motion search details later.

The Impact of Various Sizes being Too Extreme

When considering how to improve resource consumption when carrying out video compression, there are many options, however each option has a variety of advantages and disadvantages, and a balance is needed to benefit from the advantages while not suffering from the disadvantages.

In general, changing the number of motion regions and Imp blocks, by i.e. changing the size of Motion_Region_Size and Imp_Size affects the data rate, compression speed and video quality.

For example, fewer Imp blocks, i.e. larger Imp_Size values give, compared to a larger number of Imp blocks, i.e. smaller Imp_Size values, faster compression but less accurate motion vector estimation, with a higher risk of missing small features in the motion search and the higher risk of visible block boundaries when the decompressed video is presented for viewing.

In addition, having fewer Motion Regions, i.e. increasing Motion_Region_Size, can give a lower data-rate as fewer motion vectors are sent in the compressed bitstream, but this can be at the cost of non-uniform motion across the block being visible at motion block edges.

Error Function

As stated above, as part of the compression (or encoding) process, the present invention (Blackbird 9) performs a motion search, i.e. when constructing information for the bitstream in relation to a Delta frame, it is necessary to establish which pixels or groups of pixels, if any, have changed position compared to the frames relied upon to construct the Delta frame.

It is important to ensure the values generated for pixels from one frame to the next are accurate, or accurate to a predetermined degree. For example, an incorrect value for a pixel may not even be noticed if it is a small error, but a large error would be noticed easily, so it is necessary to determine an acceptable error. The acceptability of an error essentially depends on neighboring pixels—i.e. if the neighboring pixels show a plain white region, a black pixel is easy to see, but not a cream one. We therefore need to work out the error for each pixel when encoding, then include in the encoded data which pixel values include an error and send that (or an approximation to it) too, so that when decoding, the error can be factored in and the pixel corrected. This is intensive on encoding processing, but light on decoding.

For example, an incorrect pixel on a smooth area is easy to spot, an incorrect pixel on a textured area is less easy to see, so it is less sensitive to error.

Generally, the present method relates to sending less data until we reach a point that the error margin is unacceptable. This has the advantage that less data is sent where possible, and as sending data is expensive this is a good result. The method includes error checking, which ensures a high-quality outcome. The method is intensive on encoding but not intensive on decoding: as in general, encoding happens only once, and on a device chosen for this purpose, and decoding many, many times on a third-party device, this is a good outcome.

As part of this process, and to ensure the best possible quality, any errors occurring in estimating the motion of a, or a group of, pixels must be taken into account. This is important because the impact of any error of each pixel is accumulated over each Small Motion Region or Motion Region.

Any such error is the difference is between the actual pixel value of the pixel being compressed and the estimated pixel value, i.e. the pixel value that would arise from each motion vector being tested on selected frames already known to the decompressor, for each of the Y, U and V components. The error Significance estimated by the present invention is a function of this difference. The top of FIG. 5 shows a Small Motion Region containing Y values, with one of its constituent Y pixels identified as a smaller square.

In one embodiment the motion search, when initiated, establishes, for each Small Motion Region, what sort of match there is between the earlier (E) frame and the later (L) frame from which the present delta frame is being constructed. Relying on this information will mean that no motion vectors need to be sent in the bit steam, as the decompressor can calculate the same motion vectors as the compressor. This will be discussed later.

The average of the group of pixels in E and the group of pixels in L act as an initial predictor for the motion Region of C.

Blocks of pixels from E and blocks of pixels from L are chosen so that the motion vectors from blocks of pixels in E to the Motion Regions in C are the same as the corresponding motion vectors from the Motion Regions in C to the blocks of pixels in L, i.e. C is in the middle. Groups of pixels in E that match groups of pixels in L as closely as possible are chosen. In cases where an object is moving at a constant speed between E and L groups of pixels through C, the group of pixels on E that match the group of pixels in L, also typically match the Motion Region in C. Average groups of pixels in E and L give a good estimate of the Motion Region in C avoiding the need to send data regarding motion vectors in relation to C in the bitstream.

When considering groups of pixels from respective E and L frames, and achieved mid-point must match the mid-point of Motion Regions of the relevant C frame, i.e. the motion vectors from E to C and C to L are equal and opposite. This reduces the number of vectors to be searched, rendering the process more efficient.

As an overview, FIG. 5 shows a Y value of a Small Motion Region being compared with the Y value from a corresponding Y pixel in a translated block from another frame, within the Small Motion Region whose Y error Significance is being accumulated. Below the Y blocks are the corresponding UV Small Motion Regions of this frame, and the same other frame as used in the Y pixel comparison is used here, but with U and V values instead. The scaling of U and V mean that the combined UV pixels are half the height but the same width as the Y pixels in the Blackbird 9 internal representation.

In the preferred implementation, this error function is calculated independently for Y, U and V errors. The calculation is effected using one or more look up tables, calculated once before any compression takes place. It is also possible to rewrite the look up table during compression to dynamically adjust the video quality and data rate without changing the compression code itself.

In one implementation, the look up table is initialized to contain the square of the difference between the actual and estimated pixel component value.

In a further embodiment, the look up table is initialized to grow more slowly than the square of the difference when the difference is large, to reduce the impact of outliers in the source data. This is discussed later.

Acceptable Error

At a further stage of the compression process, the error between estimated and actual pixel values is tested again for acceptability, and this error is converted into a value, the error indicator (which may not be the same as the error itself, the actual error), which is used to calculate the correction to be sent in the bitstream.

In one implementation, the actual error is calculated by taking the difference between the estimated and actual values, and the error indicator is established by converting this actual error to the nearest multiple of 4 when rounding towards zero. The error indicator, which is no further from zero than the original difference (the actual error), is added by the compressor as a correction in the bitstream. This correction is then used to recreate an approximation to the original pixel value. This approximation value is used to replace the original value in the compressor so that, following this step, the compressor has the same pixel values as the decompressor for this frame. In other words, the correction is chosen to be easy to compress and to meet the quality requirement of the pixels.

Frame Configuration

The Blackbird 9 configuration has a combination of Key frames (which use exclusively intra-frame compression) and Delta frames which fit between the key frames.

Decompressing a pixel of a Key frame (which is intra-frame compressed) or a Delta frame (which may be intra-frame and/or inter-frame compressed) may require that information from other parts of the same frame are available. The pixels are decompressed in a pre-defined order which guarantees that:

1. The top left pixel is decompressed first;
2. for pixels (referred to below as "PT") on the top edge of the frame, and apart from the top left pixel of the frame, all pixels to the left of PT on the top row have already been decompressed;
3. for pixels (referred to below as "PL") on the left-hand edge of the frame, except for the top left-hand pixel of the image, the pixel above PL has already been decompressed;
4. when any other pixel P is the next pixel to be decompressed, all pixels above and to the left of the pixel P have already been decompressed and are available for use by the decompressor.

FIG. 6 shows a video frame with a white area, a rectangle comprising diagonal stripes superimposed on part of the white area, and a black area representing a pixel. The diagonal striped rectangle shows the pixels guaranteed to be known to the compressor and decompressor at the point when the pixel shown in black is to be compressed and decompressed, respectively. In Blackbird 9, the video is compressed and decompressed one Motion Region at a time, so often, when compressing and decompressing, more pixel values are known to the compressor and decompressor than this.

Delta frames can also make use of (and indeed generally require) information from neighboring key frames and other delta frames (where available) when being encoded by the compressor, and regenerated by the decompressor. To facilitate this, frames are compressed and decompressed one at a time and there is a standard order for compressing and decompressing frames which guarantees that when a delta frame D is being compressed or decompressed, all the frames which contain required data have already been compressed or decompressed. In particular, it guarantees that all the frames which contain data which was required for the compression of frame D, and hence are required for the decompression of frame D, have already been decompressed when frame D is being decompressed As disclosed in the relevant prior art, frames are arranged in Chunks. In the preferred implementation of the present invention, each Chunk is stored across multiple files when stored on a file server or web server. The first Chunk consists of a single Key frame, which is the first frame of the video. Each subsequent Chunk consists of an earliest frame, which is the first Delta frame following a Key frame, a latest frame, which is the subsequent Key frame, and a number of Delta frames in between. This is discussed later.

In the preferred implementation, Key frames are a power of two frames apart.

Bitstream Header

Each video frame within the bitstream contains a header, which may include the following information:

All frames:

blackbird_version

Allowed values for Blackbird family of codecs: (1-9). This is set to 9 in Blackbird 9.

key_sparsity

Allowed values: (1, 2, 4, 8, 16, 32, 64, 128, 256)

This is the number of frames in the Chunk this frame is part of.

video_width:
Allowed values: (1-4096 pixels)
video_height:
Allowed values: (1-4096 pixels)
alpha_flag:
Allowed values: (false or true)

If set to true, the alpha channel for this frame is compressed loss free immediately following the UV values for this frame. Alpha is compressed as 8 bits per pixel.

frame_rate:
Allowed values: (e.g. 24, 25, 30, 50, 60)

PAL and European HD videos are encoded at 25 frames per second, NTSC, US HD videos and mobile shot videos are generally encoded at around 30 frames per second.

Delta frames only:
Motion_Region_Size:
Allowed values: (0-255)

These values typically divide the source horizontal and vertical dimensions.

Key Frame Compression

Key frames are compressed using intra-frame compression. The Y values, followed by the U and V values, are compressed using corresponding techniques.

Each frame of width frame_x and height frame_y, with coordinate values numbered 0 to (frame_x−1) inclusive horizontally and 0 to (frame_y−1) inclusive vertically, is tiled with 2×2 pixel Y blocks and 2×2 pairs of UV pixel blocks.

FIG. 7 shows the Y pixels from the left-hand side of an original image, and the corners of the 2×2 tiles which tile the Y image, that is the Y component of the original image.

The corners of these tiles correspond to pixels in a smaller image of width (frame_x/2+1) and height (frame_y/2+1)—this does not correspond to the Small Frame referenced above.

Each pixel of the smaller image is constructed by averaging the original source frame pixels touching the corners of the corresponding tiles, in particular each pixel is reconstructed by using the weighted average of the 4 values at the corners of the square in which the pixel is positioned.

In one implementation, the Y values in the smaller image are truncated to six bits each.

These Y values, which represent the corners of blocks for interpolation, are added to the bitstream, preferably in a standard raster order in rows from top left to top right down to bottom left to bottom right as follows:

1. The top left value in the smaller image is sent as a raw 6, 7 or 8-bit value;
2. The other top row pixels in the smaller image are sent as differences between the pixel and its immediate neighbor to the left truncated to an 8-bit signed integer, with a fixed Context of INT_IM_Y;
3. The other left-hand pixel values in the smaller image are sent as differences between the pixel and its immediate neighbor from above, truncated to an 8 bit signed integer, with a fixed context of INT_IM_Y;
4. For the remaining pixels in the smaller image, where a block of 2×2 adjacent pixels have positions top left (tl), top right (tr), bottom left (bl) and bottom right (br), and the br pixel is to be encoded, the following data is added to the compressed bitstream:
   a. the value br+tl−tr−bl (truncated to an 8 bit signed integer with context of INT_IM_Y+256+(2*tl−tr−bl) (truncated to an 8 bit signed integer). (See FIG. 8.)

These small image pixel values can all be uniquely reconstructed by the decompressor from the bitstream as either the pixel is sent explicitly, or all its relevant neighbors and context are already known to the decompressor.

Following the corner values used for interpolation, corrections are sent for each pixel, where necessary, as follows:
1. each pixel in each of two adjacent 2×2 blocks is checked to establish the error between the interpolated Y value and the actual value;
2. for each of the eight pixels, a bit is set (the error indicator) in a mask if the pixel error (actual error) is above a critical threshold—typically when an error exceeds 16 brightness levels out for an eight-bit value, the critical value can depend on the characteristics of the local area around the pixel;
3. the mask is compressed and the compressed data added to the bitstream;
4. if the mask is non-zero, then for each pixel with an error, a correction is sent which in one implementation is the error truncated to the high six bits.

Estimates of the original source frame pixel values can be recreated by:
1. decoding the values in the small image, treating these as corner values to 2×2 pixel tiles;
2. interpolating the values in the small image to create a full-size video frame;
3. decoding the correction mask;
4. decoding the corrections from the bitstream (if any); and
5. applying the correction to the full-size frame pixels corresponding to the correction mask.

This decoded image replaces the original in the encoder to preserve consistency between the encoder and the decoder, which as described earlier is necessary for the Transitions Tables to work.

Y values used for the interpolating pixels are averaged from the pixels described above and, where the result is not an integer, are truncated towards zero.

Corner UV values in the interpolating image are simply the corner values of the original image. Other U and V values for the interpolating pixels are averaged from the relevant pixels described above and are then rounded so that:

a1) for U and V values not on the edge of the frame, $$U=\text{INT}((U1+U2+U3+U4+2)/4), \text{ and}$$

$$V=\text{INT}((V1+V2+V3+V4+2)/4);$$

a2) edge pixels are calculated as $$U=\text{INT}((U1+U2+1)/2), \text{ and}$$

$$V=\text{INT}((V1+V2+1)/2);$$

Although the overall image bias could be reduced by, for example, rounding up and down in a checkerboard pattern, this will increase the data rate as the differences between neighboring pixels will have a slightly higher variance on average, giving a wider distribution and longer average codeword length.

Although 8 bit values are used for Y, U and V, they are not always accurate to 8 bits per component per pixel, as approximations are in general made to the values in the source frames.

The estimates for Y, U and V values described are typically a low variance non-skewed distribution centered around 0.

The Context described is distributed around 0 on smooth areas of the video, with smaller Context roughly speaking giving a lower variance distribution.

Values are encoded loss free into the bitstream using Context as described above. The estimates are distributed around 0, and the Context provides a hint of the variance of the distribution. This means that the distribution used by the Transition Tables to create codewords for the values, with mean of zero and known variance, gives short codewords.

This results in a lower data-rate bitstream than a simple Huffman distribution, while preserving the loss free compression provided by Huffman.

Delta Frame Compression

The order of frame compression within a Chunk, which (as described above) is the same as the order of frame decompression of a Chunk, is defined to guarantee that frames which a Delta frame D requires for compression are all compressed before each Delta frame D is compressed, and correspondingly, that frames which a Delta frame D requires for decompression are all decompressed before each Delta frame D is decompressed.

The frame order constraint has two main elements:
1. Transition Tables must have the same experience on the compressor and the decompressor, which in the preferred case means that the frames must be compressed and decompressed in the same order; and
2. All the frames that a Delta frame depends on for interframe compression must be decompressed at the point that the Delta frame is about to be decompressed.

The frame order for compression and decompression within a Chunk is as follows (where the frames listed earlier in each section occur at an earlier time than those listed later):
1. the Key frame at the end of the Chunk;
2. a Delta frame, D1, equidistant from each of two nearest Key frames;
3. two Delta frames, D2a and D2b, equidistant from their respective Key frame and D1;
4. four Delta frames, D3a, D3b, D3c, D3d, subdividing each remaining gap in half;
5. this subdivision continues until all the frames in the Chunk have been compressed.

The number of delta frames in each Chunk, and therefore between Key frames, is usually 31 or 63 frames.

In one implementation with Key frames 8 frames apart the order in which frame are compressed (and decompressed) in each Chunk is defined as follows, see also FIG. 9 (it is noted that, more generally, the Key frames may be $2^n$ frames apart, where n is an integer):
1. a nearest earlier key frame K0a (with frame number N);
2. the subsequent key frame K0b (with frame number N+8);
3. A Delta frame D1 (with frame number N+4);
4. A Delta frame D2a (with frame number N+2);
5. A Delta frame D2b (with frame number N+6);
6. A Delta frame D3a (with frame number N+1);
7. A Delta frame D3b (with frame number N+3);
8. A Delta frame D3c (with frame number N+5); and
9. A Delta frame D3d (with frame number N+7).

It will be seen that when the offset from a key frame at frame number N is written in binary, the frame numbers have the following property:
K0: N+%000
D1: N+%100
D2: N+%?10
D3: N+%??1

Where each '?' may independently takes the value 0 or 1.

In compression, Key frame K0b can be reused if the subsequent block is compressed. In decompression, the decompressed frame K0b can be reused if the subsequent block is decompressed. (This is not possible for arbitrary delta frames as the Transition Tables data will not be correct.)

File Format

The compressed video frames can be stored in files on a server and later retrieved. In one implementation, where the chunk comprises 63 Delta frames, the frames are grouped in files as follows (see FIG. 10 for an illustration of a recommended file format):
each Key frame is stored in its own file;
each D1 Delta frame is stored in its own file to give one file per Chunk;
all (both) D2 Delta frames in a Chunk are combined to give one file per Chunk containing D2 delta frames;
all (all four) D3 Delta frames in a Chunk are combined to give one file per Chunk containing D3 delta frames;
all (all eight) D4 Delta frames in a Chunk are combined to give one file per Chunk containing D4 delta frames;
all (all sixteen) D5 Delta frames in a Chunk are combined to give one file per Chunk containing D5 delta frames); and
all (all thirty-two) D6 Delta frames in a Chunk are combined to give one file per Chunk containing D6 delta frames.

In one video editing application which uses this technology, there is a navigation bar used to navigate around the video. This can be scaled by the user to represent a number of frames per horizontal pixel position.

Referring to FIG. 10, with key frames 64 frames apart, at one frame per pixel, all frames can be navigated to by positioning a mouse at the appropriate place on the navigation bar. At two frames per pixel, only even numbered frames can be accessed—and the editing software doesn't need to download any D6 delta frames; download and decompression ends with the D5 frames. At four frames per pixel, neither D5 nor D6 frames are accessible via the navigation bar, so the software neither downloads nor decompresses these frames. Similarly, at further zooming out levels on the navigation bar, D4, D3, D2 and D1 frames are not downloaded or decompressed, with only accessible key frames downloaded. The corresponding subsets of Delta frames are similarly required when Key frames different powers of two frames apart.

This means that when a video is being navigated using the navigation bar, a user can view the navigation bar in a zoomed out manner, meaning that the video will show only key frames, in other words only key frames are downloaded and decoded. When the user considers a part of the video represented on the navigation bar to be of interest a next level of zooming may be operated, at which point only Key frames and Delta D1 frames are viewed, meaning only Key frames and Delta D1 frames are downloaded and decoded. A user can proceed to zoom further in where the video is of interest and only download and decode further delta frames for small regions of the video. Large swathes of the video will have been navigated without having to download and decode anything other than Key frames and some delta frame levels: this saves time and resources.

A unique advantage of the blackbird family of codecs is the integration, into the editor and navigator, of mechanisms relied upon.

This feature of Blackbird 9, namely the ability to access frames at a wide range of temporal resolutions, significantly reduces maximum bandwidth requirements, data transfer costs and server load on a multi-user cloud server.

Similarly, video can be played back in the editor interface at double and quadruple speed backwards and forwards. On a local device, such as a PC or mobile with limited processing power, there is no need to download frames which there is not enough processor time to decompress and display. This also allows video to be played back at very high multiples of actual speed, by playing back at a high frame rate only those frames of interest, which form a small subset of the frames in the video.

In one implementation, the server also groups the files further to reduce the number of disk accesses needed to retrieve the files. In this case, the preferred grouping for Key frames is to group some number of Key frames, say 10 or 20 Key frames, in one file.

In a similar fashion to Key frames, multiple D1 frames can be combined into one file, multiple D2 frames in a file, and so on for D3, D4 etc. (See FIG. 11 for an example where all groups of files at each Key/Delta level in 20 consecutive Chunks are grouped together). The levels with more frames are typically larger, so it can help for these to be grouped to contain files from fewer chunks.

Grouping the files in this way has the advantage that videos (at whatever frame resolution) are often played consecutively, and with a typical hard disk accessing files with a high data-rate, but also high latency per file, many frames at required resolutions are stored in single files, which can be quickly read off the disk surface into the disk cache for rapid retrieval.

More recent systems use a mixture of Solid State memory and disks. Here, Key frames and some number of Delta frame resolutions starting from D1 can be stored on the small, faster access, Flash memory, leaving the bigger and slower hard disks fewer of the relatively slow hard disk accesses. For much of the time, such as during shuttling through long videos, only the Key frames and sparser Delta frames are required. These can easily be accessed from the fast access Flash memory, significantly improving the capacity of the system when supporting multiple concurrent users.

Motion Vector Estimation Preparation Phase

In Delta frames, an attempt is made to estimate motion vectors for every Motion Region.

Modern video is often shot on hand held devices, such as mobile phones. These can be moved while facing the same direction (a tracking shot) or more frequently rotated about a vertical axis (a pan). In the pan case, a small rotation of the camera can cause the image captured by the camera to move many pixels per second. On a high-resolution video frame, the entire image can easily be panned in one second, giving an apparent motion of a thousand pixels per second or more. This presents a CPU limited software solution with an issue: how to find the motion vector which could be any one of millions of possibilities, including sub-pixel vectors, on a potentially low power device—in real time.

This section outlines how this is achieved in Blackbird 9.

As described above, the Blackbird 9 compression frame order means that at the time of encoding and decoding each Delta frame, both an earlier frame and later frame, equidistant from the current frame, are known to the compressor and decompressor.

In Blackbird 9, pixel accurate motion vectors matching Motion Regions of a subject frame to earlier and later frames are both explored. The "best fit" (as described below) from each frame is chosen.

A brute force approach to searching in real time for a good sub-pixel accurate motion vector on every video frame is impractical on a low powered software device. The search space is simply too large.

Blackbird 9 uses a series of resource-saving operations to enable this issue to be side-stepped.

The following method is used in the preferred embodiment to speed up the motion vector search at some cost to accuracy. The first thing to note is that the size, shape and shading of most objects provides for use of a low-resolution version of Motion Regions which give a good approximation of the motion vector for the original full resolution Motion Regions being sought or calculated. In this variation, the original frame is scaled so that each adjacent square of size (Imp_Size×Imp_Size) pixels in the original video is converted into a single pixel with an intensity that is the average of the pixels in the square from the original image. Thus, each Motion Region gives rise to a corresponding Small Motion Region, a factor of (Imp_Size×Imp_Size) smaller than the Motion Region from which it is derived (see FIG. 12, and as discussed in the section headed 'Block Sizes' above).

The motion search then compares this Small Motion Region with corresponding squares displaced by integer number of pixels in the nearest available earlier E and later L frames (each one of these may be either a Key frame or a higher level Delta frame).

In one possible Blackbird 9 implementation, this Small Motion Region search (see FIG. 12) is faster than the original search by a power law: in the simplest exhaustive brute force implementation, and simplest Small Motion Region search, the number of vectors searched is smaller by a factor of (Imp_Size×Imp_Size), and each block is reduced in area (and the number of comparisons is correspondingly reduced) by a factor of (Imp_Size×Imp_Size). With Imp_Size=2, this is 16 times faster. With Imp_Size=4, it is 256 times faster.

In the preferred implementation, the motion vectors resulting from the Small Motion Region search are searched at various motion resolutions, where the search step starts with Small Motion Region pixel size and is increased in resolution, each time a local minimum in the error of the match is found, by factors such as two, until the search step is Motion Region pixel size.

This final search (i.e. the search step that is Motion Region pixel sized) can be optimized as the pixels do not need sub-pixel antialiasing before comparison.

Non-powers of 2 of Imp_Size are possible but not as efficient as the powers of 2, so the preferred solutions usually have Imp_Size set to powers of 2 if the other constraints on tiling the image with Motion Regions and Small Motion Regions allow this.

Even with the search scale optimization as set out above, an exhaustive search is unnecessary and inefficient, and moreover too slow on current devices.

Blackbird 9 makes use of another resource saving operation which gives intriguingly accurate sub-pixel antialiasing without the need for a sub-pixel motion search on the relatively large (and hence slow) Motion Regions.

Where C represents the current frame number, E the nearest earlier frame known to the decompressor and L the nearest later frame known to the decompressor, the method is as follows:

Frames are compressed starting at Key frames;

then when C−E=L−C, Delta frames are compressed;

In particular, the Delta frames are compressed in sets, the set grouping determined by the reduction in factors of two of the value of C−E=L−C, starting with the frame C mid time between sequential Key frames. The Delta frames are combined in Groups, where within each Group, C−E=L−

C=constant, and between each Group the value of C−E=L−C differs by a factor of 2.

The motion search is done starting with the closest together Delta frame Groups—the Groups of Delta frames are searched in the opposite order to the compression Delta frame Group output order. This is because frames near in time tend to have smaller motion vectors and so this search will be more accurate and quicker. So the motion search starts on C−E=L−C=1. This frame difference situation is termed Granularity=1.

In one embodiment, the motion vectors for C−E and L−C are calculated independently using a Slow Search as follows:

For each motion block, Concentric "Rings" of motion vectors are searched, starting from the Current Search Centre i.e. a motion vector of (0 pixels, 0 pixels) (see FIG. 13). The concentric "Rings" are, in one implementation, actually concentric squares, where the maximum distance from the Current Search Centre horizontally or vertically is constant. This allows fast loops horizontally and vertically, with good memory caching horizontally. In another implementation, the concentric "Rings" are actually concentric diamonds, where the total distance horizontally and vertically from the Current Search Centre is constant. This allows more horizontal and vertical vectors for any given search size, which more closely matches real vectors, so (on average) requires fewer vectors to be searched.

The minimum error for all the mooted search vectors in each Ring is calculated. The errors (and best match) for three concentric Rings are compared.

If a motion vector on the inner Ring has the lowest error, it is deemed that all further untested concentric Rings will have a worse error and that the best error has been found. In this case the search is halted at this Ring, and the best motion vector found so far is used. Although there may be better motion vectors further out, the benefit of not incurring the costs looking at Rings further out is out-weighs the benefit of potentially finding a lower error motion vector.

If, on the other hand, the motion vector on the inner Ring is a worse match than either of the next two additional Rings outwards, the inner Ring is removed and a further additional outer Ring is checked as above, and the process repeated. Only vectors on the Ring which make the E or L (as relevant) Motion Region appear entirely on the respective E or L frame, when adjusted for the relevant motion vectors, are included in the search.

It is contemplated that alternative numbers of Rings may be searched, until increasingly higher errors occur, before the motion search is terminated. Searching fewer Rings speeds up the search at the cost of more larger vectors being missed; searching more Rings slows down the search but leads to fewer missed motion vectors.

When the search process for each Motion Region terminates, the vectors relating to frames E and C, and relating to frames C and L, are stored for use on further iterations. For example, where C−E=L−C=1, the motion vectors are stored for later use in the preliminary motion search for Delta frames which are further apart.

For searches of motion vectors between non-consecutive frames, the Current Search Centre for the search for the motion vector from frame E' to frame C is initialized to the estimate calculated by adding together the already known and stored motion vectors for the relevant block for E' to (E'+C)/2 and for (E'+C)/2 to C. The corresponding estimate for the motion vector search from C to L' is used as the Current Search Centre for this search. These estimates give good first guesses for the motion vectors as the frame differences (and in general, the motion vector sizes) increase. At each stage, the search fine tunes any errors in the estimate. This results in a vast reduction of the search space and search time.

The case where the frames differences C−E=C−L=1, which is the case where the Delta frames are adjacent in time, is termed Granularity=1. The case where the frame differences are >1 is termed Granularity >1.

In some embodiments, a different number of concentric Rings are checked for the best error. Checking a smaller number of Rings can lead to false positives, where (potentially very) different motion vectors are chosen. The codec then patches up errors, increasing data-rate—and the time this takes negates some of the time saving of having a smaller search based on a smaller number of rings. It has been found that checking a larger number of Rings tends to give the same motion vectors at minimal improvement to the motion vectors, but is more resource intensive.

When finalized on bitstream output (see below) the best valid motion vectors for each Motion Region for E to C and from C to L are sent in the bitstream.

In a further embodiment, the vector searched for using a similar Ring algorithm is for Motion Region vectors between frames E and L. In this case, C is not used to estimate the motion vectors. As both E and L are already known at decode time before the frame C is decoded, these vectors can be calculated at decode time without being sent explicitly in the bitstream. This saves significant data-rate, and allows smaller Motion Regions and finer matching of smaller features, but at the cost of more processor time on the decoder.

Patch ups sent in the bitstream ensure the frames look good, even when the vectors are amiss.

The use of motion vectors significantly reduces the data rate in many cases, particularly when the motions are linear.

For linear (constant velocity) motion, the motion vectors from E to C and from C to L are the same (see FIG. 14). Although each vector is only estimated to the nearest pixel, in this case, the vectors from E to C and for C to L are rounded to integers in opposite directions, so if one is slightly too far to the left, the other is slightly too far to the right. Averaging blocks from the earlier and later previously known frames results in an excellent approximation to a sub-pixel anti-aliasing without the need for a sub pixel search.

In a preferred implementation of the invention, all these motion searches take place on the Small Frames with various values of Imp first, for speed, using anti-aliasing to estimate the sub-pixel motions. When the suitable lowest error vector is found, a new larger Small Frame with a smaller Imp is calculated. The larger Small frame is preferably a factor of two horizontally and vertically larger than the previous one. The level of sub-pixel anti-aliasing during motion estimation in this larger Small Frame is correspondingly reduced so that motion vectors still corresponds to pixels in the original Source frame. After one or more iterations, the motion search is performed on pixel accurate images, with the expectation that by this time the motion search will be small and the search will be fast, despite the relatively large number of pixels in the image.

In one embodiment, the motion vectors are first searched and estimated when the minimum number of frames that are needed to estimate them are available. So with frame 0,1 and 2 available to the Blackbird 9 codec, (E, C, L)=(0, 1, 2) can and does have its earlier and later vectors calculated. Then when frames 3 and 4 are known, (E, C, L)=(2, 3, 4) and (E, C, L)=(0, 2, 4) vectors are calculated. This refinement spreads out the CPU time used by the codec. By the time next key frame arrives, most of the vectors have been estimated, reducing the latency of the compression.

As outlined above, Blackbird 9 uses compression frame ordering to search for motion vectors for non-adjacent frames quickly by starting the search with an estimate of the motion vectors calculated from motion vectors estimated earlier.

For Motion Regions in these non-adjacent Delta frames, the sum of the motion vectors vEC and vCL from the next closest together frames is used to give the central estimate for the motion vector vEL (see FIG. 15). A region of vectors around this value is searched (see FIG. 16). The lowest error value is used to give a "best" motion vector from this search.

The frame is then zoomed in one step at a time, at each step increasing the resolution of the image being searched, and with neighboring vectors searched at each resolution in a directed search until a local minimum in the error function is found. The Imp level searches are searched at a sub-pixel level of the Small Region pixels to simulate single pixel resolution in the original frame. Nearest neighbors are searched first, with the search moving to the nearest neighbor with the lowest error unless the current vector gives a local minimum for the error, when diagonal neighbors are checked and followed if lower than the current vector, returning to a nearest neighbor search. When all 8 neighboring vectors give a worse error, the scale zoomed in by dividing Imp_Size by a factor of 2 if it is even, or to the nearest integer above this if it is odd.

After some number of iterations, the search reaches a pixel search, which is implemented more efficiently as no antialiasing is used. Mirroring the sub pixel search, all nearest neighbor motion vectors are checked, repeatedly following the path of steepest descent to a local minimum. Then diagonal neighbors are checked and the search is stopped if these are also all worse errors than the current estimate; otherwise a nearest neighbor search continues centered on the best diagonal and the search continues. The search finishes when the pixel search error is at a local minimum of all eight nearest neighbors.

The motion vectors in this preparation stage are then stored for use later either in the preparation stage, and/or for fine tuning during the bitstream output phase.

The error significance, which is a function of the Y errors, for all pixels in each Small Motion Region or Motion Region (where relevant) is summed to give the error significance for the motion vector for the Small Motion Region or Motion Region respectively. In one implementation, the error significance for the pixel is the square of the difference between the pixel in the source frame and the pixel in the motion block from a second frame.

In one embodiment, the error calculation is implemented using a look up table. The function can be changed with minimal performance or code changes—for example to a function which limits the error contribution from far out pixels.

Blackbird 9 also includes a contribution from the UV (color) errors in a similar way—adding each color pixel error significance to a Y total to give an overall error.

Fixing Blocky Artefacts

Some video codecs exhibit blocky artefacts—in particular, visible block edges—when the codec is stressed either by shortage of CPU or shortage of data-rate.

In most videos, the linear translations of blocks from other available frames used as motion vectors are sufficient for a good visual match without block artefacts. Two exceptions are:

1. when the video is rotating (common on handheld mobile shot content); and
2. when the luminance gradient changes.

In these cases, there may well be no block from a different image which is a good match (see FIG. 17 and FIG. 18). Blackbird 9's method of patching up pixels with significant YUV errors can remove noticeable errors. Blackbird 9's ability to average frames from the past and the future is often effective, as the average of past and future frames equal time away from the current frame accurately simulates both gradually linear temporal changes in grey scale slope and gradual constant rate of rotation. Even so, the human eye is good at picking up correlated pixels, so a set of consistently slightly out pixels is visible even when any one pixel with a similar error on its own is not. Patching up all pixels to the accuracy which would make these block edges invisible would be wasteful.

To fix up these small visible block edge errors, the Motion Regions are processe$^d$ as follows (see FIG. 19):

1. each estimated block is compared with the original;
2. the 'sign' of the error (namely −1, 0 or +1) between the estimated block and the original (allowing some small flexibility where, in one implementation and for example only, differences in the range [−3,3] are encoded as sign of 0) is stored in an array corresponding to the pixels in the Small Motion Region or Motion Region in question;
3. the pixels with positive and negative 'sign' then go through a clump shrinking stage, which converts all +1 or −1 signed pixels which have neighboring pixels (in one implementation nearest neighbor and in another including diagonals) within the Small Motion Region or Motion Region of a different sign to sign 0, so that the edge pixels in signed pixels groups are ignored, and the central pixels retained;
4. the pixels in a positive or negative clump which touches the edge of the block and are near the block edge are counted to give an area in pixels.

The total number of clumped pixels near the edge TC (including both those with positive and with negative bias) is then calculated. Typically, the total covers those pixels within a two pixel wide band of the Region edge, to reflect its primary purpose of disguising block edges, though this could be wider or narrower. If TC is bigger than a threshold, for example 40 on a 20×20 Motion Region, the block is deemed not a good match after all, despite the mean square error (or other error function) of all the pixels being low enough not to exclude the match.

If both motion vectors from E and from L are rejected, through this mechanism or simply by having too large a total error, blocks are signified in the bitstream as type flags=0. These blocks are encoded as intra frame blocks, and re-sent without reference to the subtly inaccurate best matching blocks on E or L frames.

This method effectively removes visible block artefacts on many frames caused by using motion vectors to compress Motion Regions on delta frames.

Find Error ELp

If E and L both have plausible motion blocks, the relative size of the error function values of the block from the frame E and the block from the frame L is compared. If one is much better than the other (typically error ratio of around 2:1), the single better frame, that is the one with the lowest error, is used.

In addition, the average of the E and L blocks, adjusted for average luminance bias across the block, is checked for error, and compared with the error for the relevant blocks from E and L individually (also adjusted for bias). If the average gives a bigger error than a block from either individual frame, it is rejected in favor of the block from the single frame with the smallest error. This reduces playback time and reduces average error.

In practice, the single frames E or L are better than the average for E and L only about 10% of the time. This confirms how effective averaging the motion-vectored blocks from equidistant earlier and later frames is at finding a good match.

Motion Vector Estimation Output Phase

At this point in the process, we have estimates for the motion vectors for every Motion Region of every source video frame.

The next step is to calculate the motion vectors in their final form and output the bitstream. Three constraints limit the order in which the frames are compressed:

1. the way Transition Tables are used demands that the video frames are created in a consistent order, starting with a Key frame;
2. The requirement to be able to play video back at negative integer powers of two fractions of the full frame rate further restricts the order of frames, with different Groups of Deltas being output with the Groups of Delta frames furthest apart in time being calculated first, and the Groups of Delta frames closest together being calculated last; and
3. a further constraint is to allow, where possible, when compressing and decompressing all the frames, the earliest Delta frames to be compressed and decompressed first, as normally during playback these are played back first and hence required first.

This leads to the frame order in Blackbird 9: frames are output in the specific order K0, K1, D1, D2a, D2b, D3a, D3b, D3c, D3d, D4a, D4b, . . . (for as many Delta frames as exist, dictated by the number of frames that separate the key frames.

Prior to output into the bitstream for the compressed video, the motion vectors for all Motion Regions in these frames are checked again for being a good fit.

The following applies to Y values with some elements applying to U values and V values.

For each Motion Region, the mean and variance of the Y values in the Motion Region of the version of the source frame being compressed, are calculated.

A maximum allowed error (i.e. value of the error function) for each Motion Region compared with Motion Region(s) from other frame(s) is defined. This maximum allowed error is smaller for frames which are far apart, as these frames are re-used directly and indirectly to estimate more further frames in the Chunk. The allowable error between each predictive group of pixels from E or L in its respective Motion Region in C is a decreasing function of L−E, so the allowable error in the temporal estimates from E and L for Motion Regions in C stays the same or gets larger as the predictor frames E and L get closer to C. In one implementation, a lower maximum allowed error was used when C−E>=4, where C and E are the frame numbers of the current frame and the earlier frame being used to provide predictor pixels for Motion Regions, to ensure the Deltas with the most frames, and available for use directly or indirectly for the fewest number of frame predictions, take less data per frame. These are the candidate areas of E and L frames used to estimate Motion Regions in the current frame C. Reducing the data rate of close together frames helps to keep the files, which contain the most deltas, small.

An allowed error for the Y value of any pixel is calculated. This is based on the standard deviation of the values in its Motion Region, with a constant added to allow for, inter alia, the expected noise level.

As even high-quality cameras have noise on their video feeds, an estimated error for idealized "smooth" blocks from a typical camera feed is taken into account to reduce false rejection of good matches.

Next, the combined error (taking into account errors in Y, U and V) for the "best" motion vector estimate based on the earlier Motion Vector Estimation Preparation Phase, is calculated. If this looks sensibly small, a more accurate error is calculated for this motion vector, taking into account the average Y bias across the Motion Region to allow for brightness varying between frames independently of motion of objects in the frame.

Pixels are only used to estimate motion regions in C when all the pixels are on the relevant E or L source frames, that is the negative of the motion vector when applied to the motion region in C, doesn't take any of the pixels off the frame.

Very big biases are always rejected to prevent weird coincidences without physical foundation appearing in the compressed video. These may have relatively small errors, but their unnatural cause can lead to errors standing out to the human eye.

Big clumps of errors with the same sign near the block edges are rejected as described above. These would tend to give the video a blocky appearance if not rejected. They can arise if there is a rotation of the video or a non-linear or changing shading.

This is all done for both the E frame and the L frame.

Flags are set to indicate which combination of E and L (or neither) is a good fit according to the above error checking process.

As stated above, if the predictor block of pixels from frame E is an exact match for the Motion Region from the subject frame C, only this E frame block should be used, in addition, if the predictor block of pixels from frame L is an exact match for the Motion Region of the subject frame C, only this L frame block should be used. Using only one estimate takes less computation and caches better on the CPU, saving memory accesses.

If, for the Motion Region being considered, (E error/L error) or (L error/E error) is big, only the best one should be used. In one implementation, a ratio of 2:1 works well to define this ratio as 'big'.

Motion vectors have a limited range in both horizontal and vertical directions. In one implementation vectors up to [−512,511] are allowed. Motion Regions with horizontal or vertical pixel motion vectors outside this range are deemed not to match well.

Motion vectors which would lead to predictor pixel blocks that do not have all their pixels on the relevant E or L source frame are automatically rejected.

Near the edge of the video frame, a motion region in C may correspond in real life to pixels which would be out of the frame in either E or L. As the motion search excludes matches partially or completely off screen, the lowest error allowable matching block may be a nearby onscreen block. The next check excludes such probably erroneous blocks as follows: if both vectors are still superficially valid, but one of the groups of pixels from E or L (First group of pixels) touches the edge of its frame, and the other of E or L predictor suggests (by reversing its motion vector and applying this to the Motion Region in C to estimate where the group of pixels would have come from in the First group of pixels if its frame had unlimited area, such reversed motion vector corresponding to the case in linear motion from E frame to C frame to L frame) that the predictor block on the edge should have been partially or wholly outside its frame, making it Suspicious, then the E or L frame block with the vector with the Suspicious component is excluded.

Y, U and V values are used to estimate the motion vectors. The U and V motion vectors are always calculated, in each of the horizontal and vertical directions, as half the corresponding Y vector components.

In summary, when deciding the Motion Region sized block to match a Motion Region in the current frame (see FIG. 20):

1. set flags to indicate use of blocks from both E and L to estimate the C block;
2. exclude those where the error is bigger than some value depending on the frame difference;
3. if E has error of 0, use only that one; if not then if L has error of 0, use only that one;
4. if error ratio >2.0, exclude the worse one;
5. exclude vectors which look Suspicious because the other vector is valid and the vectors hint that Suspicious vector comes from off the screen; and
6. if flags still indicate using both E and L, but using only one of E and L gives a lower actual error, use the single best one instead.

It is now appropriate to begin writing the bitstream for the Motion Regions in frame C. The exact order and resolution are not crucial to this invention; one embodiment uses this order and value:

1. Output flags (L<<1)+E encoded as a 2 bit number, or using Transition Tables;
2. send motion vectors for E frame and L frame, each only when used;
3. for Context for the motion vectors, use the previous motion vector;
4. in this case, truncate vectors to 10 bit signed dx and dy vectors; and
5. set the Y bias to the mean of the block, rounded towards zero and write the bias into the bitstream using the old bias as the Context.

Writing the Y Delta Values into the Bitstream

In general, the Y values stored in the bitstream are not loss free representations of the Y values in the source frames. They are instead chosen to be just good enough to optimize the data-rate and compression time. The process of updating a Motion Region's YUV value depends on the values of the E and L flags set above.

Below, CY_bias is the average Y value of a Motion Region in the Current frame (MRC), EY_bias is the average Y value of the best match Motion Region to MRC in the Earlier frame, and LY_bias is the average Y value of the best match Motion Region to MRC in the Later frame. The 'best_estimate' calculated below shows the result of the calculation for each pixel value estimate.

When both E and L flags are set (that is pixels from both Earlier and Later frames, when moved with chosen motion vectors and adjusted for bias, are good matches for this Motion Region in the Current frame (C), the initial estimate for MRC is the average of the Earlier and Later Frame Motion Region Y values, each with their own integer motion vector. For each pixel in a Motion Region:

best_estimate=CY_bias+((*E*[pixel+*E* motion]+*L*[pixel+*L* motion])>>1)−((EY_bias+LY_bias)/2)

When only the E flag is set, only pixels for the Earlier frame Motion Region, when moved and adjusted for bias, are used as the initial estimate of the Motion Region in the Current frame C. Then:

best_estimate=CY_bias+(*E*[pixel+*E* motion])−EY_bias.

When only the L flag is set, for the corresponding reasons, for each pixel, best_estimate is set to the corresponding expression using L instead of E.

In these cases, the initial estimate is then checked for accuracy on a pixel-by-pixel basis:

1. the best estimate is moved to the nearest value in the range [0,255];
2. a difference D is calculated between this estimate and the pixel value to be compressed;
3. if the absolute value of D is bigger than the allowable error for pixels in this block (sd_error), then the gap to this pixel since the start of the block or the previous correction, followed by the Error, is sent in the bitstream, and the gap from the last correction is reinitialized;
4. if D is smaller than or equal to sd_error, the current frame (C) is updated to the best_estimate, and on decoding the best_estimate is set to the same value; on both the encoder and decoder the gap from the last pixel correction position is incremented;
5. at the end of the Motion Region, the Motion Region block area in pixels is sent to signal the end of a block with a common codeword;
6. the color (UV) delta blocks are also decoded (see section below). Using half the Y motion vector value is correct in most cases.

In addition, an important feature of a video codec is what artefacts appear as the compression rate is increased. One which appears with block-based compression, like Blackbird 9, is the appearance of block edges. For example:

(a) Codecs like MPEG are based on DCT (Discrete Cosine Transform) encoded blocks, which means that changes to the coefficients affect all the pixels in a block to varying degrees. In Blackbird 9, each pixel can be corrected directly and independently of the other pixels. For instance, as set out above, the appearance of errors on block edges is reduced, but a further feature is used when the individual clump errors are low (see FIG. 19), but the relative motion of blocks allows the eye to catch inconsistent motion between neighboring blocks—blocks which slide past each other. Thus, in the case where there is a significant motion difference between neighboring blocks (as estimated by the motion estimation), the tolerance between predicted and actual pixel errors near edges is reduced further, where near an edge in this case corresponds to the half of the block on the side of the relatively-sliding neighboring block. The effect of this solution is to remove visible block edges (which would typically not be visible on any individual frame) appearing during video playback.

(b) Accuracy of individual pixels is adjusted depending on the context in the video being compressed. Each pixel's neighbor for a few pixels out in each of the 4 directions up, left, right and down, are checked for contrast between neighbors. Where the pixel is in a smooth area, only minimal errors are allowed (in one implementation, only 1 grey scale between neighboring pixels) to allow for smooth slopes quantized at the level of the source image e.g. 256 luminance levels. The number of consistently low contrast/smooth directions for e.g. 3 pixels is then counted, but it is contemplated that other values are suitable: although the preference is between 2 and 4. Areas which are smooth in 3 or 4 directions (from up, down, left and right) are sent loss free, and for those which are smooth in 2 directions a small error is allowed. 1 and 0 direction smooth pixels are allowed relatively large errors, as these are in high textured areas where errors are not noticeable, particularly as the source images are generated using blocks in other frames which are already realistic. In the lossy case, corrections are chosen to be from a restricted set such as multiples of powers of two to limit errors in the representation to a small range and compress the corrections efficiently.

(c) In addition, Transition Tables give the codewords for any given Context their own distribution. An example of an effective Context is as follows:

For a block of 2×2 pixels ab on the top row, and pixels cd directly underneath:

the estimate (b+c−a) for d is a good estimate.

In particular, for edges and smooth areas, the errors in the estimate (which are sent in the bitstream) have a low variance distribution with mean 0, so compress well. Using the Context b+c−2a, or similar, makes a significant reduction in the datarate, with the high contrast areas (likely to lead to a higher variance distribution in the error in the estimate of d) having different distributions from the lower contrast areas of the video frames.

The compressor is updated to contain the actual values the decompressor would decode. When the pixel-by-pixel approximation of the Motion Region is correct or nearly correct, no per-pixel data is sent, only a "gap" encoding the length of the Motion Region.

When the approximation would have been too different from the actual value, a correction is sent in the bitstream. This correction may not be perfectly aligned to the original frame, but will be close enough and easy to compress. The compressor copy of the original frame is updated to reflect the value sent.

If the flags for both E and L are unset, meaning that neither is a good match, the block is compressed using an analogous compression to that used in key frames, treating the Motion Region as a mini version of a frame as used in the Key frame compression.

Writing the UV Delta Values to the Bitstream

The UV pixels are each checked for accuracy, and a similar correction/gap structure exists as in the Y case.

In the UV case, either both the UV values are updated or neither is updated, independently of whether the Y pixels are updated. In practice, these are rarely updated since the UV errors in the motion blocks are almost always small and the approximation realistic.

The color of each pixel is estimated from:
the appropriate Earlier frame Motion Region (E) with appropriate motion vector;
the appropriate Later frame Motion Region (L) with appropriate motion vector, or a combination of motion adjusted pixels on the two frames (E+L+1)/2. The appropriate motion vector is half the Y motion vector.

Whether an individual pixel should be upgraded depends on the color in the frame being compressed and the color of the estimate.

In the following section:
1. a "Chroma Value" can be U or V;
2. "Actual" represents the actual chroma value in the frame being compressed;
3. "Estimate" gives the estimated value of the pixel Chroma Value;
4. "Leeway" gives an amount of variation allowed in a Chroma Value;
5. "Max" and "Min" are the maximum allowed ratios (as calculated below) to use the Estimate;
6. "GreyScale" shows the scale of color sensitivity in certain cases near grey and is set to 16.

For each Chroma value, the following test decides whether to use the Estimate or something based directly on the Actual value (see FIG. 21):
1. if both the Actual and Estimate are near grey, then Estimate should be used;
2. if either one of the Actual or the Estimate is not near grey (i.e. outside Leeway from grey), then more care is needed;
3. Near grey, the hue of the color is sensitive to small changes in U and V, so a more accurate color representation may be required;
4. Further from grey, the ratio of Actual and Estimate can be used to gauge suitability.
   a. In this case, if Actual is grey, the size of Ratio is set to 1+abs(Estimate/GreyScale). In this case, for values larger than Max, Estimate is rejected as not being sufficiently near grey.
   b. If Actual is not grey but is near grey, and Estimate is near grey, and Estimate and Actual are near to each other, then use Estimate, otherwise the Estimate is not near the Actual in which case only use Estimate if the ratio is between Min and Max.
5. If Estimate is near grey, but Actual is not, then only use Estimate if the ratio is in the range Min to Max.

In a preferred implementation, the same tests are used for each of U and V:
if both are an accurate match, the Estimate is used;
if either is inaccurate, the gap to this UV pixel is encoded (with fixed Context), the Chroma is rounded to the nearest multiple of 2, with rounding towards grey, and the update U and update V are encoded with the context for U being the previous U update value, and the context for V being the previous V update value, with grey as the initial context for both.

Earlier and or Later Frame Encoding

In one implementation, the E and L flags are encoded as a single codeword of E+2L, with the previous flags value (or 0 if the first block) encoded as a zero.

In a second implementation, the flags are encoded as a pair and passed through the Transition Tables mechanism, using the previous pair as context. This gives a lower data-rate overall as the dependence between consecutive E and L flags is picked up by the Transition Tables AI mechanism.

Local Contrast

Errors on high contrast areas are less visible than similar sized errors on low contrast areas. In one embodiment, when deciding whether a pixel is accurately represented by the motion block, the codec takes local contrast into account.

When the pixel is on an edge within the Motion Region, it compares the error with pixel contrast on the same side of the edge, rather than across the edge. This results in smooth sides of different intensities on either side of an edge both appearing as low contrast despite the edge, and thus both sides being represented accurately.

Non-Temporally Interpolated Delta Frame Updates (Intra-Block Compression)

Blocks in a delta frame may not be a good match to either E, L or both combined, as described above.

In this case the Y, U and V values are encoded in a similar way to the key frames, but within a single Motion Region.

Intra-block compression proceeds as follows (see FIG. 8):

1. the block is tiled with 2×2 squares, and the Y values at the corner of each such square are estimated by averaging the corner pixels known within the block;
2. with four neighboring corners in a square labelled "tl" for top left, "tr" for top right, "bl" for bottom left and "br" for bottom right, the corner br is compressed by first calculating a difference (br+tl−tr−bl) & 0xFC (when implemented in the C++ language) (different bit truncation—or none—may also be used); this difference is compressed using the Transition Tables, with context of (2tl−tr−bl);
3. pixels along the edges of the Motion Region are treated analogously to edges of Key frames in Key frame compression;
4. pixels in the spatially interpolated image are compared with the un-interpolated frame being compressed, and are corrected by sending a mask of pixels identifying which pixels have large errors, for example by having each set bit corresponding to a large error (in one example application where the absolute value of the difference between the interpolated pixel and the original pixel is >24); in another embodiment, the smooth detection in b above gives more accuracy for pixels which are part of smooth areas;
5. for every set bit in the mask in 4), the errors are corrected to within, in one example, the range (−8,8), by taking the abs(difference)&−8 and multiplying by its sign(difference)—this is less accurate than the representation used for key frames but these frames are designed to look realistic in the context of being assembled from other realistic looking frames with motion and corrections, and are not re-used as often as for Key frames so errors have less impact overall;
6. UV Motion Regions are updated in a similar way, mirroring UV for key frames;
7. for UV pixels, errors >16 are corrected to the range (−8, 8), by using corrections which are a multiple of 8 to save data rate. Other rounding and corrections are possible, giving corresponding changes to video quality and data rate.

For Y, U and V, the quantization of the corrections significantly reduces the data rate, and gives a higher cache hit rate in the Transition Tables, speeding up playback.

Context for Y is the same for all of these Y corrections. U and V Context is different from Y context but the same for U and V. U and V use the same context for key frames and error values used for patching up pixels. Y uses difference Context values for Key frames and Delta frame error patches for pixels, all of which are constant. (This reflects the wider variation in Y changes and corrections than UV ones.)

In one implementation, these quantized error patch ups are combined in pairs to reduce the average codeword length per correction. Without this many of the codewords are only 1 or 2 bits in length, reducing the efficiency of the integer length Transition Tables codewords. Combining codewords means that fewer codewords are written into the bitstream, but it increases the learning time of the Transition Tables AI engine, so works better when the Key frames are far apart and the compressed frames are larger.

In all cases, the compression updates its model of frames being compressed to match the decoder model. Where the Small Frame will be used to assist further refinement of motion vectors (i.e. L−E>2), the Small Frames are updated too.

In the bitstream, in the preferred invention, UV follows Y for each key frame, and on the delta frames, the UV for each Motion Region follows the Y for each Motion Region.

In use, a camera may capture a video, and the video may be encoded by the codec in accordance with the present invention.

The codec separates the video into chunks which include Key frames separated by Delta frames, each Key frame separated from the next Key frame by a number of Delta frames (the total number of Delta frames being a power of two).

Key frames are encoded using intra-frame compression, and Delta frames are encoded using intra and inter-frame compression, with Delta-1 frames relying on the next earliest Key frame and the next latest Key frame; Delta-2 frames relying on either the next earliest Key frame and the next later Delta-1 frame, or the next earliest Delta-1 frame and the next later Key frame, and so on.

Once all the frames are compressed by the codec they are distributed according to frame identity, i.e. key frames are stored in a Key frame file, Delta 1 frames are stored in a Delta 1 frame file, Delta 2 frames are stored in a Delta 2 frame file and so on. This has the advantage that on reviewing the video the user has the option to view only higher level files such as Key and Delta 1 files, meaning that only these files need to be accessed on a server, downloaded and decoded, providing for an overview that allows for fast and efficient jog and shuttle, and other navigation of the video.

When a specific region of the video is selected for closer inspection, lower level files (for Delta 3, 4, 5 and so on) may then be downloaded and decoded, providing the user with a clear and detailed video replay of the section of video of interest.

One problem with this approach is that large amounts of data are necessarily present in the lower level Delta frames, meaning that these frames are very large and resource intensive to download and decode. The present invention overcomes this problem by reducing the amount of data that needs to be present in the lower level Delta files.

The amount of data needed in the lower level Delta files is reduced by analyzing the data that needs to be sent in the bit stream for the decoder to reconstruct the relevant Delta frames, and only sending data that is essential. Significantly, lower level frames are constructed from known (already encoded/decoded) higher level frames so that initial information (Key frame information) is given in detail but lower level frames include only 'changes'. In addition, when compressing/decompressing the individual frames, each portion of the frame is based, where matches are good, on earlier, known (i.e. already compressed/decompressed) portions of the frames.

Delta frames are constructed from adjacent higher level Delta or Key frames: it is contemplated that adjacent frames are largely similar, i.e. not much changes between frames, so that only information on the difference needs to be sent. This difference is estimated based on working out the change for each Motion Region (i.e. calculating the motion vectors) and sending that in the bitstream for applying to relevant portions of E and/or L frames when constructing a frame. This method means that once the Key frames are known (they must be sent in detail) the Delta frames can be rebuilt relying on motion data with limited corrections.

One problem with this approach is that artefacts associated with the approach can be introduced which can be very noticeable and can also destroy the integrity of the decoded video.

The present invention estimates errors, assesses whether they are sufficiently significant to be attended to, and determines what information needs to be included into the bitstream to mitigate or correct them. In addition, the present invention takes account of artefacts and determines what information needs to be included in the bitstream. This avoids the decoded video showing errors and blocky-ness, resulting in a high quality decoded video.

One method of accomplishing this is to include in the bitstream for the encoded video, the information that needs to be sent to avoid noticeable errors and artefacts destroying the integrity of the video. This has the advantage that both the encoder and the decoder will remain synchronized so that the same Transition Tables and Context may be used when preparing the bitstream for sending, and receiving the bitstream for decoding resulting in an even greater efficiency in terms of data that needs to be sent (the data rate) without losing the accuracy of the original video.

Encoding is more resource intensive, but only happens once, whereas decoding is less resource intensive which is useful as it happens often, and is also suitable for a variety of devices and/or implementation languages.

As an overview, when encoding and decoding video data for transmission or storage, a critical feature is how movement between frames is provided for. One method is to carry out a comparison, pixel by pixel, between one frame and the next, but the impact of this on processing time, and data rate, makes it impractical. The present method refers to dividing frames into 'motion blocks' each of which is make of 'IMP' blocks, each of which is a block of typically 4 or 16 pixels. In general an average of a group of pixels is taken and then a comparison of this average between two frames is carried out to see if anything has changed. If a change is detected, this averaged pixel group is explored in more detail. This means that most of the work to be done is eliminated the lower resolution versions of the frames are quick to handle compared with the original frames, and as little effort is directed to areas of a frame in which nothing has changed in the lower resolution frames.

The invention is contemplated to include apparatus which include the encoder and/or decoder; apparatus applying the encoder/decoder to a video stream; the method of, and apparatus used for, applying the encoder/decoder to a video stream; the method of, and apparatus used for, calculating errors; the method of, and apparatus used for, searching to achieve a best match; the method of, and apparatus used for, estimating edge effects; the method of, and apparatus used for, applying the changes to a video stream for encoding to match the decoding process to maintain synchronicity between the Transition Tables and Context relied upon.

What is claimed is:

1. A computer-implemented method for encoding a video stream comprising:
dividing the video stream into:
a first Key frame, and
subsequent chunks each comprising $2^n$ frames, where n is an integer greater than one, each chunk including a Key frame and $2^n-1$ Delta ($D^x$) frames, where x is a positive integer from 1 to n, and denotes the level of the Delta frame, and where $2^{x-1}$ denotes the number of Delta frames at level x in the chunk;
the method including the step of constructing $D^x$ level frames from adjacent Earlier and Later $D^y$ frames, where y<x and y is an integer from 0 to x−1, where for y=0, $D^y$ is a Key frame, for all frames in a chunk where x>0;
wherein the constructing step includes:
dividing the frame into Motion Regions representing groups of pixels;
determining a pixel group in an Earlier (E) $D^y$ frame and in a later (L) $D^y$ frame that is a best match for a pixel group in a Motion Region of a Current (C) $D^x$ frame; and
determining motion vectors for the best matches for the Motion Regions,
the method including building a bitstream wherein motion vector data is represented by a quantity of data in the bitstream,
the method further comprising correcting inaccuracies by determining, for each neighborhood comprising a predetermined number of pixels, the difference in grey scale value of adjacent pixels in each direction, such that
(i) if the difference is no greater than 1, or no greater than 2, or no greater than 3 grey scale values in three or four directions, no difference is permitted between predicted and actual pixel values, and any difference is corrected;
(ii) if the difference is no greater than 1, or no greater than 2, or no greater than 3 grey scale values in 2 directions, a maximum value of difference is permitted between predicted and actual pixel values before a correction is applied, wherein said maximum can vary between 1 and 16 greyscales; and
(iii) if the difference is no greater than 1, or no greater than 2, or no greater than 3 grey scale values in one or zero directions, a larger difference than in two directions is permitted before a correction is applied.

2. The method of claim 1, wherein the predetermined number of pixels is 2, 3, 4 or 5 pixels.

3. The method of claim 1, wherein during encoding, Key frame compression comprises intra-frame compression, wherein as x increases, information on $D^x$ frames also includes inter-frame compression from respective $D^y$ frames.

4. The method of claim 1, wherein determining said best match includes, for each frame: determining Small Frames derived from averaging pixels in respective frames,
comparing groups of pixels in the Small Frames of said E $D^y$ frame and said L $D^y$ frame to establish candidate motion vectors to map onto Small Motion Regions of the Small C $D^x$ Frame, wherein said comparing step includes:
for each motion vector tested, comparing pixels, with the motion vector applied, in the Small Frames of the E $D^y$ frame and of the L $D^y$ frame, with the Small Motion Region in the Small C $D^x$ Frame,
iteratively, until a best match can be identified,
iteratively for each Small Motion Region in the C $D^x$ Frame.

5. The method of claim 4, wherein candidate motion vectors are established by searching:
in concentric squares, or
in a diamond pattern,
until no better match is found for two or more consecutive searches.

6. The method of claim 4, wherein said best match is determined by:
applying candidate motion vectors to pixels in candidate groups of pixels of said Small Frame version of the E $D^y$ frame and the Small Frame version of the L $D^y$ frame to predict pixel values in a Small Motion Region of said Small C $D^x$ Frame;
comparing said predicted values with actual pixel values in said Small Motion Region of said Small C $D^x$ Frame;

determining differences between said predicted and actual pixel values to establish an Error value;

determining a Significance of each Error value, wherein the Significance is a function of the Error value and summing said Significances, wherein the respective best matches for the pixel groups in the Small Frame version of the E $D^y$ frame and the pixel groups in the Small Frame version of the L $D^y$ frame are the motion vectors which give the smallest sum of Significances.

7. The method according to claim 6, wherein the motion vectors are further refined by analyzing versions of the E $D^y$, C $D^x$ and L $D^y$ frames at increasing resolution until the motion vectors are pixel accurate.

8. The method of claim 4, wherein said best match is determined by:

applying candidate motion vectors between groups of pixels in the E $D^y$ frame and corresponding groups of pixels in the L $D^y$ frame, to predict pixel values in a Motion Region of said C $D^x$ frame, thereby avoiding sending motion vectors for said C $D^x$ frame in the bitstream.

9. The method of claim 7, wherein said candidate motion vectors for groups of pixels in the E $D^y$ frame to the Motion Region in the C $D^x$ frame are equal to said candidate motion vectors from the Motion Region in the C $D^x$ frame to the group of pixels in the L $D^y$ frame.

10. The method of claim 6, wherein said Significance is an increasing function of the absolute value of the error, with a gradient that increases as the error approaches a predetermined maximum allowed error per pixel, and falls where the error exceeds a maximum allowed error per pixel.

11. The method of claim 6, wherein if the estimate for the Motion Region based on the E $D^y$ frame and the L $D^y$ frame has an error greater than a predetermined value, the respective predictor is not used, wherein as x increases within a chunk, the allowable error between predicted and actual Motion Region values is an increasing function of x.

12. The method of claim 1 further comprising:
assigning differences between estimated and actual pixel values as 0, −1 or +1, where:
  0 corresponds to a difference of approximately 0,
  −1 corresponds to a significant negative difference, and
  +1 corresponds to a significant positive difference,
  wherein a significant difference corresponds to a desired picture quality, where high values provide lower picture quality;
  re-assigning to zero each pixel whose sign is different to any adjacent pixel,
  deriving a value from the number of remaining positive or negative values at or near a Motion Region edge;
  rejecting the motion vector and corresponding predictive group of pixels from the E $D^y$ frame or the L $D^y$ frame for this Motion Region as a poor match if this value exceeds a threshold.

13. The method of claim 1, the method further including a method of decoding a video stream, wherein said $D^x$ frames are encoded and decoded by referencing Transition Tables and Context; each Context code word giving its own distribution within its Transition Table.

14. The method of claim 1, wherein if one of the relevant groups of pixels from an E $D^y$ frame or an L $D^y$ frame touches the edge of its frame, and the other of the E $D^y$ frame or the L $D^y$ frame predictors suggests that the said predictor group of pixels on the edge should be off its screen and thus is Suspicious, then the E $D^y$ frame or the L $D^y$ frame group of pixels with the Suspicious component is excluded from the prediction of the Motion Region in the C $D^x$ frame.

15. The method of claim 1, wherein respective Key and Delta frames from respective chunks are stored together such that Key frames are stored in a Key frame file, $D^1$ frames are stored in a Delta 1 frame file, and so on until $D^x$ frames, for the greatest value of x in the chunk, are stored in a $D^x$ frame file.

16. A non-transitory machine-readable medium having instructions that, when executed, cause a method for encoding a video stream to be performed, the method comprising:
  dividing the video stream into:
    a first Key frame, and
    subsequent chunks each comprising $2^n$ frames, where n is an integer greater than one, each chunk including a Key frame and $2^n-1$ Delta ($D^x$) frames, where x is a positive integer from 1 to n, and denotes the level of the Delta frame, and where $2^{x-1}$ denotes the number of Delta frames at level x in the chunk;
  constructing $D^x$ level frames from adjacent Earlier and Later $D^y$ frames, where y<x and y is an integer from 0 to x−1, and where for y=0, $D^y$ is a Key frame, for all frames in a chunk where x>0;
  wherein the constructing includes:
    dividing the frame into Motion Regions representing groups of pixels;
    determining a pixel group in an Earlier (E) $D^y$ frame and in a later (L) $D^y$ frame that is a best match for a pixel group in a Motion Region of a Current (C) $D^x$ frame;
    determining motion vectors for the best matches for the Motion Regions; and
  building a bitstream wherein motion vector data is represented by a quantity of data in the bitstream,
the method further comprising correcting inaccuracies by determining, for each neighborhood comprising a predetermined number of pixels, the difference in grey scale value of adjacent pixels in each direction, such that
  (i) if the difference is no greater than 1, or no greater than 2, or no greater than 3 grey scale values in three or four directions, no difference is permitted between predicted and actual pixel values, and any difference is corrected;
  (ii) if the difference is no greater than 1, or no greater than 2, or no greater than 3 grey scale values in 2 directions, a maximum value of difference is permitted between predicted and actual pixel values before a correction is applied, wherein said maximum can vary between 1 and 16 greyscales; and
  (iii) if the difference is no greater than 1, or no greater than 2, or no greater than 3 grey scale values in one or zero directions, a larger difference than in two directions is permitted before a correction is applied.

17. The non-transitory machine-readable medium of claim 16, the non-transitory machine-readable medium having instructions that, when executed, cause a method of decoding a video stream to be performed, wherein said $D^x$ Delta frames are encoded and decoded by referencing Transition Tables and Context; each Context code word giving its own distribution within its Transition Table.

18. A device including a camera, a processor and a non-transitory machine-readable medium having instructions that, when executed by the processor, encode a video stream captured by the camera, wherein the video stream is divided into:

a first Key frame, and subsequent chunks each comprising $2^n$ frames, where n is an integer greater than one, each chunk including a Key frame and $2^n-1$ Delta ($D^x$) frames, where x is a positive integer from 1 to n, and denotes the level of the Delta frame, and where $2^{x-1}$ denotes the number of Delta frames at level x in the chunk;

the instructions, when executed by the processor, constructing $D^x$ level frames from adjacent Earlier and Later $D^y$ frames, where y<x and y is an integer from 0 to x−1, and where for y=0, $D^y$ is a Key frame, for all frames in a chunk where x>0;

wherein the constructing includes:
  dividing the frame into Motion Regions representing groups of pixels;
  determining a pixel group in an Earlier (E) $D^y$ frame and in a later (L) $D^y$ frame that is a best match for a pixel group in a Motion Region of a Current (C) $D^x$ frame;
  determining motion vectors for the best matches for the Motion Regions; and
  building a bitstream, wherein motion vector data is represented by a quantity of data in the bitstream, the non-transitory machine-readable medium having instructions that, when executed by the processor, correct inaccuracies by determining, for each neighborhood comprising a predetermined number of pixels, the difference in grey scale value of adjacent pixels in each direction, such that (i) if the difference is no greater than 1, or no greater than 2, or no greater than 3 grey scale values in three or four directions, no difference is permitted between predicted and actual pixel values, and any difference is corrected;

(ii) if the difference is no greater than 1, or no greater than 2, or no greater than 3 grey scale values in 2 directions, a maximum value of difference is permitted between predicted and actual pixel values before a correction is applied, wherein said maximum can vary between 1 and 16 greyscales; and (iii) if the difference is no greater than 1, or no greater than 2, or no greater than 3 grey scale values in one or zero directions, a larger difference than in two directions is permitted before a correction is applied.

19. The device of claim 18, wherein the instructions, when executed by the processor, decode a video stream, wherein said $D^x$ Delta frames are encoded and decoded by referencing Transition Tables and Context; each Context code word giving its own distribution within its Transition Table.

20. The device of claim 18, wherein the device is a mobile phone or a personal computer.

21. The device of claim 19, wherein the device is a mobile phone or a personal computer.

* * * * *